US010480176B2

(12) United States Patent  
Unger

(10) Patent No.: US 10,480,176 B2  
(45) Date of Patent: Nov. 19, 2019

(54) MODULAR BUILDING

(71) Applicant: 1 Space Pty Ltd, West Perth, Western Australia (AU)

(72) Inventor: Susan Unger, Mt Lawley (AU)

(73) Assignee: 1 Space Pty Ltd, West Perth (AU)

( * ) Notice: Subject to any disclaimer, the term of this patent is extended or adjusted under 35 U.S.C. 154(b) by 0 days.

(21) Appl. No.: 14/413,421

(22) PCT Filed: Jul. 11, 2013

(86) PCT No.: PCT/AU2013/000768  
§ 371 (c)(1),  
(2) Date: Jan. 8, 2015

(87) PCT Pub. No.: WO2014/008548  
PCT Pub. Date: Jan. 16, 2014

(65) Prior Publication Data  
US 2015/0152634 A1    Jun. 4, 2015

(30) Foreign Application Priority Data

Jul. 11, 2012  (AU) ................................ 2012902966  
Jan. 4, 2013   (AU) ................................ 2013900027

(Continued)

(51) Int. Cl.  
*E04B 1/343*     (2006.01)  
*E04B 1/348*     (2006.01)  
(Continued)

(52) U.S. Cl.  
CPC ............ *E04B 1/34336* (2013.01); *E04B 1/19* (2013.01); *E04B 1/3483* (2013.01);  
(Continued)

(58) Field of Classification Search  
CPC ............ E04B 1/34336; E04B 1/34384; E04B 1/3483; E04B 1/19; E04B 2/58  
(Continued)

(56) References Cited

U.S. PATENT DOCUMENTS 2,438,428 A  *  3/1948  Birdsall .................. B65D 9/26  
                                               217/65  
3,123,186 A  *  3/1964  Adkinson, Jr. et al. .. E04B 1/14  
                                               52/125.2

(Continued)

FOREIGN PATENT DOCUMENTS

AU    2008200652       11/2008  
CN    102011497        4/2011  
(Continued)

OTHER PUBLICATIONS

International Search Report for PCT/AU2013/00768 dated Nov. 19, 2013.

(Continued)

*Primary Examiner* — Paola Agudelo  
(74) *Attorney, Agent, or Firm* — Oppedahl Patent Law Firm LLC

(57) ABSTRACT

A modular building unit for construction of a building comprises a structural frame 40 suitable for interconnection to another modular building unit in construction of the building; and a stud frame wall 80/82 internal to and fixed to the frame. The modular building unit is suitable for handling as a shipping container for transport.

5 Claims, 16 Drawing Sheets

(30) Foreign Application Priority Data

| | | | |
|---|---|---|---|
| Jan. 4, 2013 | (AU) | ............................ | 2013900029 |
| Mar. 19, 2013 | (AU) | ............................ | 2013900962 |
| Mar. 24, 2013 | (AU) | ............................ | 2013100359 |
| Mar. 24, 2013 | (AU) | ............................ | 2013201852 |

(51) Int. Cl.

| | |
|---|---|
| *E04H 1/00* | (2006.01) |
| *E04H 1/02* | (2006.01) |
| *E04H 3/02* | (2006.01) |
| *E04H 3/08* | (2006.01) |
| *E04B 1/19* | (2006.01) |
| *E04B 2/58* | (2006.01) |
| *E04B 5/10* | (2006.01) |
| *E04H 9/14* | (2006.01) |

(52) U.S. Cl.
CPC ............ *E04B 1/34384* (2013.01); *E04B 2/58* (2013.01); *E04B 5/10* (2013.01); *E04H 1/005* (2013.01); *E04H 1/02* (2013.01); *E04H 3/02* (2013.01); *E04H 3/08* (2013.01); *E04B 1/34846* (2013.01); *E04B 2001/199* (2013.01); *E04B 2001/1993* (2013.01); *E04B 2001/34389* (2013.01); *E04B 2001/34876* (2013.01); *E04B 2001/34892* (2013.01); *E04H 9/14* (2013.01); *Y02A 50/14* (2018.01)

(58) Field of Classification Search
USPC .......................................................... 52/79.1
See application file for complete search history.

(56) References Cited

U.S. PATENT DOCUMENTS

| | | | | |
|---|---|---|---|---|
| 3,629,984 | A * | 12/1971 | Richardson ............ | E04B 2/7854 52/241 |
| 4,185,763 | A * | 1/1980 | Geraedts ................. | B65D 5/38 229/120.01 |
| 4,231,199 | A * | 11/1980 | Gomez ..................... | E04B 1/04 52/204.2 |
| 4,799,525 | A * | 1/1989 | Seymour .................. | E06B 9/11 160/133 |
| 4,817,355 | A * | 4/1989 | Tilsley ...................... | E04B 1/80 52/317 |
| 4,854,094 | A | 8/1989 | Clark | |
| 4,910,932 | A * | 3/1990 | Honigman ................ | E04B 1/08 52/280 |
| 5,279,436 | A * | 1/1994 | Elliott .................. | B65D 88/528 206/321 |
| 5,285,604 | A * | 2/1994 | Carlin ...................... | B60P 3/14 52/143 |
| 5,511,908 | A * | 4/1996 | Van Valkenburgh ........................ B65F 1/1426 206/386 |
| 5,755,062 | A | 5/1998 | Slater | |
| 6,205,713 | B1 * | 3/2001 | Thompson ................ | E06B 9/02 49/465 |
| 6,463,705 | B1 * | 10/2002 | Davis ...................... | E04B 1/343 52/143 |
| 6,604,328 | B1 * | 8/2003 | Paddock ............. | E04B 1/34315 52/264 |
| 6,675,540 | B1 * | 1/2004 | Rokes ................. | E04B 1/34336 220/1.5 |
| 7,827,738 | B2 * | 11/2010 | Abrams .................. | E04B 1/003 52/79.1 |
| 7,832,155 | B1 * | 11/2010 | Shea .................. | E04B 1/34336 280/789 |
| 8,001,730 | B2 * | 8/2011 | Wallance ................ | E04B 1/003 52/79.1 |
| 8,763,317 | B2 * | 7/2014 | Krell ........................ | E04B 1/04 52/91.1 |
| 9,109,354 | B2 * | 8/2015 | Toubia ................ | E04B 1/34321 |
| 9,121,168 | B2 | 9/2015 | Levy | |
| 2005/0262778 | A1 | 12/2005 | Allen | |
| 2006/0185262 | A1 * | 8/2006 | Abler ..................... | E04B 1/3442 52/64 |
| 2007/0193137 | A1 * | 8/2007 | DeBoth .................... | E06B 9/02 52/202 |
| 2007/0271857 | A1 * | 11/2007 | Heather ................ | B65D 88/005 52/79.9 |
| 2008/0134589 | A1 * | 6/2008 | Abrams .................. | E04B 1/003 52/79.1 |
| 2008/0226434 | A1 * | 9/2008 | Smith .................. | B65D 88/022 414/332 |
| 2008/0263968 | A1 | 10/2008 | Day | |
| 2009/0019811 | A1 * | 1/2009 | Goldman ............... | E04B 1/3483 52/653.2 |
| 2009/0199492 | A1 * | 8/2009 | Gibson .................. | E04B 1/3431 52/79.7 |
| 2010/0031587 | A1 | 2/2010 | Weeks | |
| 2010/0287848 | A1 * | 11/2010 | Pepin .................... | E04B 1/3483 52/79.9 |
| 2011/0094166 | A1 * | 4/2011 | Lavi ......................... | E04H 9/04 52/79.1 |
| 2012/0037198 | A1 * | 2/2012 | Cantin .................. | E04B 1/3442 135/143 |
| 2012/0110925 | A1 * | 5/2012 | Weber ....................... | E03C 1/01 52/79.1 |
| 2012/0266546 | A1 * | 10/2012 | Gyory .................... | E04B 1/3444 52/126.1 |
| 2013/0036702 | A1 * | 2/2013 | Pacetti .................. | E04H 1/1205 52/653.2 |
| 2013/0067846 | A1 * | 3/2013 | Kvols .................. | E04H 1/1205 52/586.1 |
| 2013/0276373 | A1 * | 10/2013 | Haab ....................... | E05D 15/26 49/360 |
| 2013/0305626 | A1 * | 11/2013 | Strickland ........... | E04B 1/34384 52/79.5 |
| 2014/0078652 | A1 * | 3/2014 | Kamen ..................... | E04H 9/00 361/679.01 |
| 2014/0090312 | A1 * | 4/2014 | Medley ................ | E04B 1/34357 52/79.5 |
| 2014/0115976 | A1 * | 5/2014 | Lippert ................. | E04H 1/005 52/79.2 |
| 2014/0223840 | A1 * | 8/2014 | Wheeler .................. | E04B 1/343 52/79.9 |
| 2014/0298745 | A1 * | 10/2014 | Rechenmacher ......... | E04C 3/02 52/425 |
| 2015/0034634 | A1 * | 2/2015 | Mullaney .............. | E04B 1/3431 220/1.5 |
| 2015/0052815 | A1 * | 2/2015 | Arteta Loredo ........ | E04F 10/10 49/81.1 |
| 2015/0159363 | A1 * | 6/2015 | Ehsasi .................. | E04H 1/1205 52/79.5 |

FOREIGN PATENT DOCUMENTS

| | | |
|---|---|---|
| CN | 102304942 | 1/2012 |
| CN | 102304942 A | 1/2012 |
| GB | 2476102 | 6/2011 |
| JP | 7-54012 | 6/1995 |
| JP | 10-8569 | 1/1998 |
| JP | 11-264194 | 9/1999 |
| JP | 2011-288817 | 10/2001 |
| KR | 10-2009-0034690 | 4/2009 |
| KR | 10-2011-0076653 | 7/2011 |
| NZ | 605059 | 8/2014 |
| WO | 94/05879 A1 | 3/1994 |
| WO | 96/030601 A1 | 10/1996 |
| WO | 2008027234 | 3/2008 |
| WO | 2010020108 | 2/2010 |
| WO | 2010/031129 A1 | 3/2010 |
| WO | 2011018056 | 2/2011 |
| WO | 2011092333 | 8/2011 |
| WO | 2011096955 | 8/2011 |

(56) References Cited

FOREIGN PATENT DOCUMENTS

WO      2012/021334 A2    2/2012
WO      2012/129601 A1    10/2012

OTHER PUBLICATIONS

International Preliminary Report on Patentability for PCT/AU2013/00768 Completed Oct. 31, 2014.
Canadian Office Action dated May 2, 2019 in Canadian application No. 2878720.

* cited by examiner

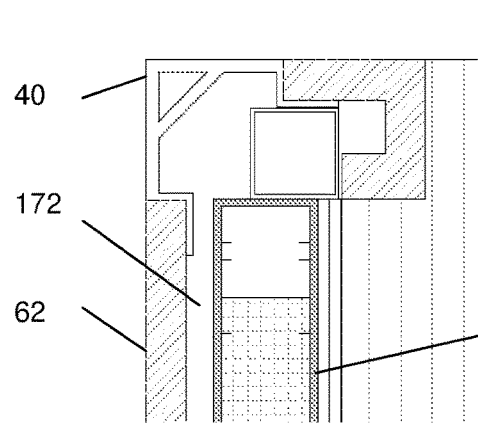
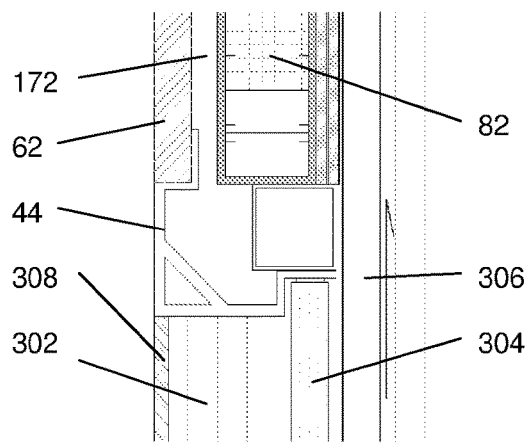
FIG. 28  FIG. 29A
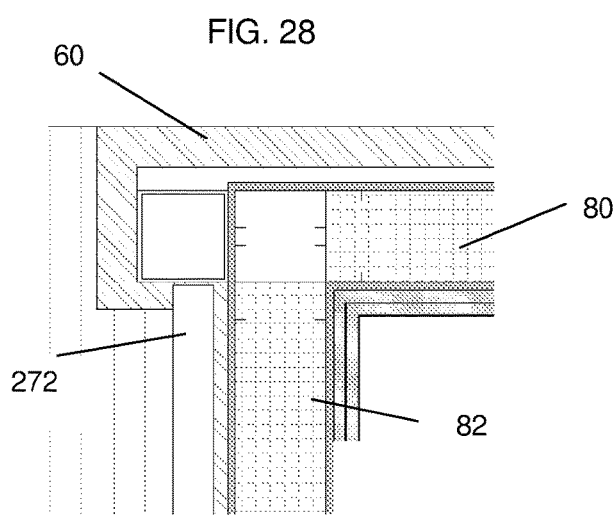
FIG. 29
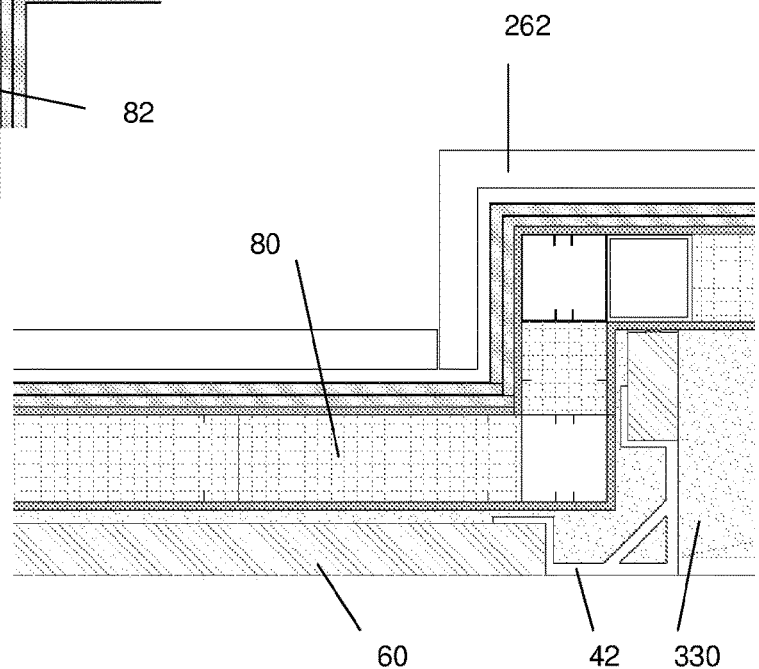
FIG. 30

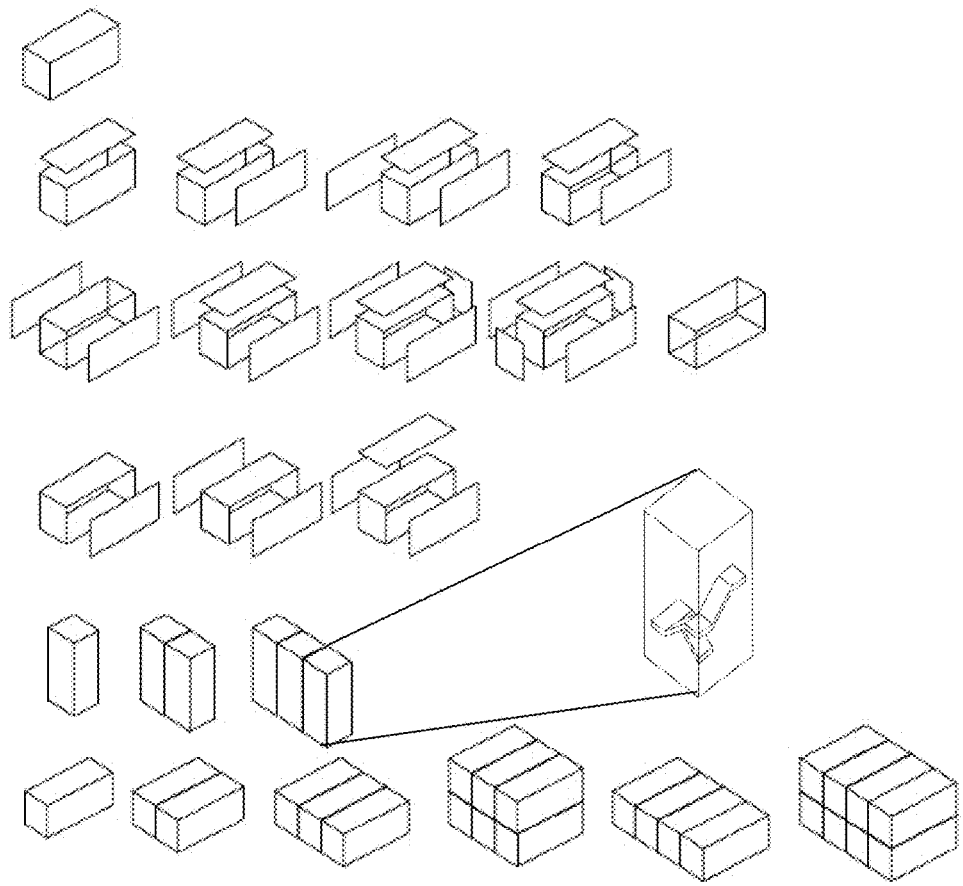
FIG. 34
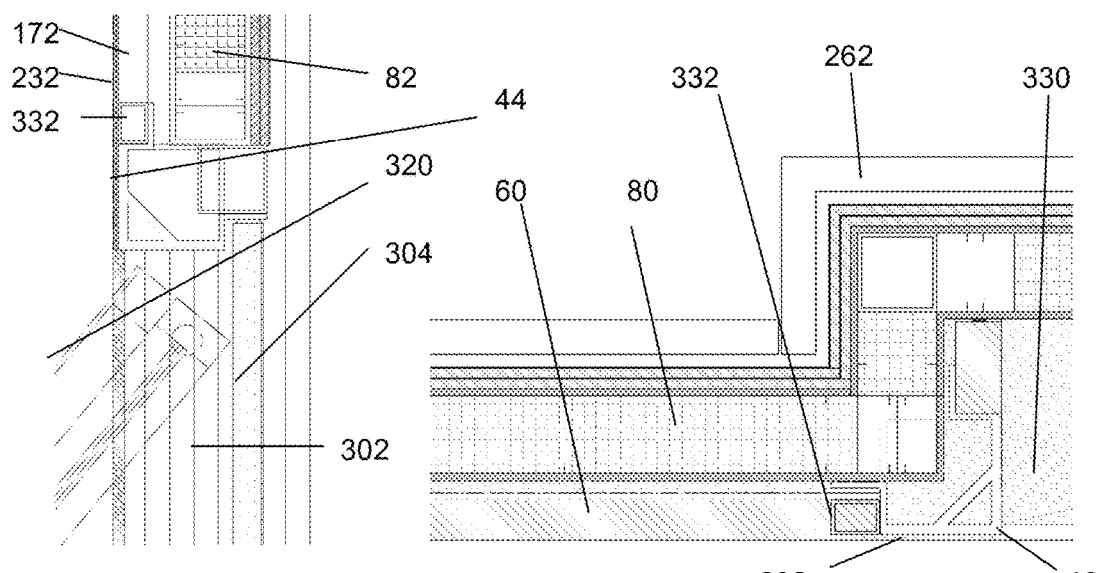
FIG 29 B
FIG 30A

MODULAR BUILDING

BACKGROUND

Buildings formed of recycled intermodal shipping containers, sometimes called sea containers, are known. However they have not seen mainstream adoption due to inherent limitations with the use of these containers. It is believed that such buildings are currently based on the premise of taking one or more shipping containers (generally used) and modifying them, such as by removal of side walls and/or end wall or end doors according to the design of the building.

A typical shipping container has standard dimensions: 8 feet wide (2.44 m), 20 feet (6.06 m) or 40 feet (12.19 m) long, and 8 feet 6 inches (2.59 m) high. An alternative type, a High-cube (HQ) container is 9 feet 6 inches (2.9 m) high. Containers of 10 feet 3 inches (3.12 m) are also known. These containers are designed for carriage on a ship stacked one on top of another and include a steel casting on each of the eight corners, pairs of which are welded to either end of each of the four corner posts of a rectangular parallelepiped steel frame. Attached to the frame are side walls, and a roof generally formed of a flat or corrugated sheet of weather resistant steel or aluminium and have hinged double doors on at least one end.

For use in a building, shipping containers require extensive modification, such as cutting through or removal of the side walls, to be suited for use in a building so as to allow windows, side entry or a different form of doorway. Further they are limited to a width of 2.44 m and a length of 6.06 m or 12.19 m, which in turn limits room sizes to fit within these dimensions.

It is with this background that the present invention has been developed.

Reference to prior art documents is not an admission that they form part of the common general knowledge of a skilled person in any jurisdiction.

SUMMARY OF THE INVENTION

According to the present invention there is provided a modular building unit for construction of a building, said modular building unit comprising:

a structural frame suitable for interconnection to another modular building unit in construction of the building;

wherein the modular building unit is suitable for handling as a shipping container for transport.

In an embodiment the building unit further comprises a stud frame panel internal to and fixed to the frame, wherein the frame and panel in combination are load bearing.

In an embodiment the structural frame is in the form of a rectangular prism.

In an embodiment the structural frame is in the form of a rectangular table shape, comprising a rectangle and four legs, each leg extending from one of the corners of the rectangle. Typically the rectangle will be at the base of the building unit and the legs will extend vertically. In such a case it will be typical to have another rectangle a structural frame of another building unit joined at the corners to ends of the legs such that the other rectangle and the structural frame form a rectangular prism.

In an embodiment the panel contributes to the structural capacity of the modular building unit to withstand forces applied to the modular building unit.

In an embodiment the panel coincides with a face of the frame. In an embodiment the panel is set back from a face of the frame.

In an embodiment the panel is or forms part of a wall partly defining a room at least in part within the modular building unit.

In an embodiment the building unit comprises a plurality of structural stud frame wall panels internal to and fixed to the frame, the walls defining a room within the modular building unit, the plurality of panels contributing to the structural capacity of the modular building unit to withstand forces applies to the modular building unit. In an embodiment the forces include static forces, such as from other building units stacked on top of the building unit, and from dynamic forces, such as those experienced in cyclonic weather conditions.

In an embodiment the modular building unit comprises a non-structural wall panel for forming a partition to a room in the modular building unit.

In an embodiment the building unit comprises a veranda deck internal to the frame, but able to be opened to the exterior of the frame. In an embodiment the veranda deck is open to the exterior of the building through one of the faces of the building unit.

In an embodiment the veranda deck comprises shutters for closing the veranda deck during inclement weather conditions. In an embodiment the veranda deck comprises a rail or balustrade along one of the faces of the building unit.

In an embodiment the veranda deck is open to a veranda deck of an adjacent building unit in use.

In an embodiment a wall partitioning the veranda deck from a room in the building is insulated. In an embodiment an enclosure of the veranda deck is uninsulated.

In an embodiment the building unit further comprises a portion of a building-internal service access-way internal to the frame. In an embodiment the building-internal service access-way is covered by a removable panel for transport. In an embodiment the building-internal service access-way is open to the exterior of the frame when the removable panel is removed.

In an embodiment the building unit further comprises a first portion of a building-internal service access-way able to be externally open on the modular building unit and arranged so that when another building module with a complementary second portion of a building-internal service access-way is placed adjacent the first portion they define a combined portion of a building-internal service access-way.

In an embodiment the building-internal service access-way is in the form of a recess in a face of the building unit.

In an embodiment the building unit further comprises a weather resistant external panel affixed to each side and end face of the frame. In an embodiment the external panels are removable.

In an embodiment the building unit further comprises a removable panel affixed to a side and/or end face for transport, wherein the panel is formed of FRP.

In an embodiment an air gap is provided between the external panel and a wall internal to the frame. In an embodiment the wall internal to the frame is the stud frame panel.

In an embodiment the external panel provides load bearing support to the frame.

In an embodiment the building unit further comprises a plurality of beams extending transversely across the bottom of the frame and inwardly spaced from the ends of the frame for attachment to ground supports or another building unit.

In an embodiment one or more of the frame or transverse beams are formed of Fibre Reinforced Polymer (FRP).

In an embodiment the building unit further comprises one or more removable vertical supports on side faces of the frame.

In an embodiment the unit further comprises one or more removable vertical supports on side faces of the frame, wherein the vertical supports are formed of a FRP beam.

In an embodiment the internal walls are formed of a stud frame with an insulating material inside the stud frame.

In an embodiment the building unit further comprises a structural panel internally affixed to a top face of the frame.

In an embodiment the unit further comprises a panel affixed to a top face of the frame, wherein top panel is formed of FRP.

In an embodiment the building unit further comprises an opening in a side or end face when the removable panel is removed from the respective side or face for allowing movement to another building unit in the building.

In an embodiment an external finish is applied to the panels on a side/end of the building unit or ceiling of the unit.

In an embodiment the frame has attachment points at each corner.

In an embodiment the frame has attachment points at each corner formed of FRP.

In an embodiment the building unit is of a width between 2.4 m and 6 m and preferably between 2.6 and 4.2 m. In a preferred embodiment each container is of a width of about 3.3 m (11') to 3.5 m.

In an embodiment the building unit is of a length of 6 m (20'). In other embodiments the container is of a length of one of 6.8 m, 7.2 m, 12 m, 14.4 m, 18 m, or 36 m.

In an embodiment the building unit is of a height of 2.9 m (9'6") to 3.2 m. In an embodiment each container is of a height of about 3.48 m. In an embodiment each tall container is of a height of 5.8 m (19') to 6.2 m.

In an embodiment the building unit is a tall container, where the tall container has a height of two other unit stacked one on another and a length of half the length of other building units. In an embodiment length is about 3 m. In an embodiment each tall container is of a height of 8.7 m.

In an embodiment the frame of the container forms a structural element of a building formed of a plurality of such building units.

In an embodiment the end and or side panels of the container form a structural element of a building formed of a plurality of such building units.

In an embodiment the building unit is configured such that it can be assembled into the building without structural modification.

In an embodiment the building unit is stackable for transport and is able to be stacked in the building.

In an embodiment the building unit comprises a portion of a roof to be placed above the building unit when the building unit is formed into a building.

In an embodiment a truss of the roof portion is formed of FRP. In an embodiment a roof cladding sheet of the roof portion is formed of FRP. In an embodiment the roof portion comprises lifting points.

In an embodiment an opening for receiving a forklift tine comprises a casing form of FRP.

According to the present invention there is provided a modular building unit for construction of a building, said modular building unit comprising a structural frame suitable for interconnection to another modular building unit in construction of the building and a wall of the building unit comprises:

a first structural panel internal to and fixed to the frame so as to be parallel with a face of the frame; and a second structural panel fixed to the frame so as to be parallel to and spaced from the first structural panel so as to provide an air gap therebetween;

wherein the modular building unit is transportable.

Also according to the present invention there is provided a building module comprising a roof portion to be placed above the building unit when the building unit is formed into a building.

In an embodiment the roof portion comprises a truss formed of FRP.

Also according to the present invention there is provided a building comprising a plurality of modular building units, each modular building unit according to one or more of the descriptions above.

In an embodiment the building comprises longitudinally side by side frames and parallel adjacent back to back internal walls of each building unit.

In an embodiment the building comprises building-internal service access-way formed on at least two building-internal service access-way portions of at least two adjacent building units. In one embodiment the building-internal service access-way portions are formed by the building units being end to end. In one embodiment the building-internal service access-way portions are formed by the building units are side by side. In one embodiment the building-internal service access-way portions are formed by the building units are end to end and side to side.

Also according to the present invention there is provided a method of constructing a building comprising providing a plurality of building units as defined above and placing the building units next to one another and connecting the units together into a single structure.

In an embodiment the building units are placed end to end. In an embodiment the building units are placed side by side.

In an embodiment the building units are stacked.

Also according to the present invention there is provided a panel for use in a building comprising a sheet of FRP having mounting points for fixing the sheet to a structure.

In an embodiment a first surface of the sheet is finished in a manner suitable for decorative use prior to fixing to a structure.

In this specification the terms "comprising" or "comprises" are used inclusively and not exclusively or exhaustively.

DESCRIPTION OF DRAWINGS

In order to provide a better understanding of the present invention preferred embodiments will now be described, by way of example only, with reference to the accompanying drawings, in which:

FIG. 28 is an enlarged horizontal cross-section of detail D1 of FIG. 24;

FIG. 29 is an enlarged horizontal cross-section of detail D2 of FIG. 24;

FIG. 29a is an enlarged horizontal cross-section of detail D4 of FIG. 24; and

FIG. 29b is an enlarged horizontal cross-section of and alternative detail D4 of FIG. 24;

FIG. 30 is an enlarged horizontal cross-section of detail D3 of FIG. 24;

FIG. 30A is an enlarged horizontal cross-section of an alternative detail D3 of FIG. 24;

FIG. 34 is a schematic set of isometric views showing alternative building configurations according to an embodiment of the present invention;

DESCRIPTION OF PREFERRED EMBODIMENTS

Figure 1:
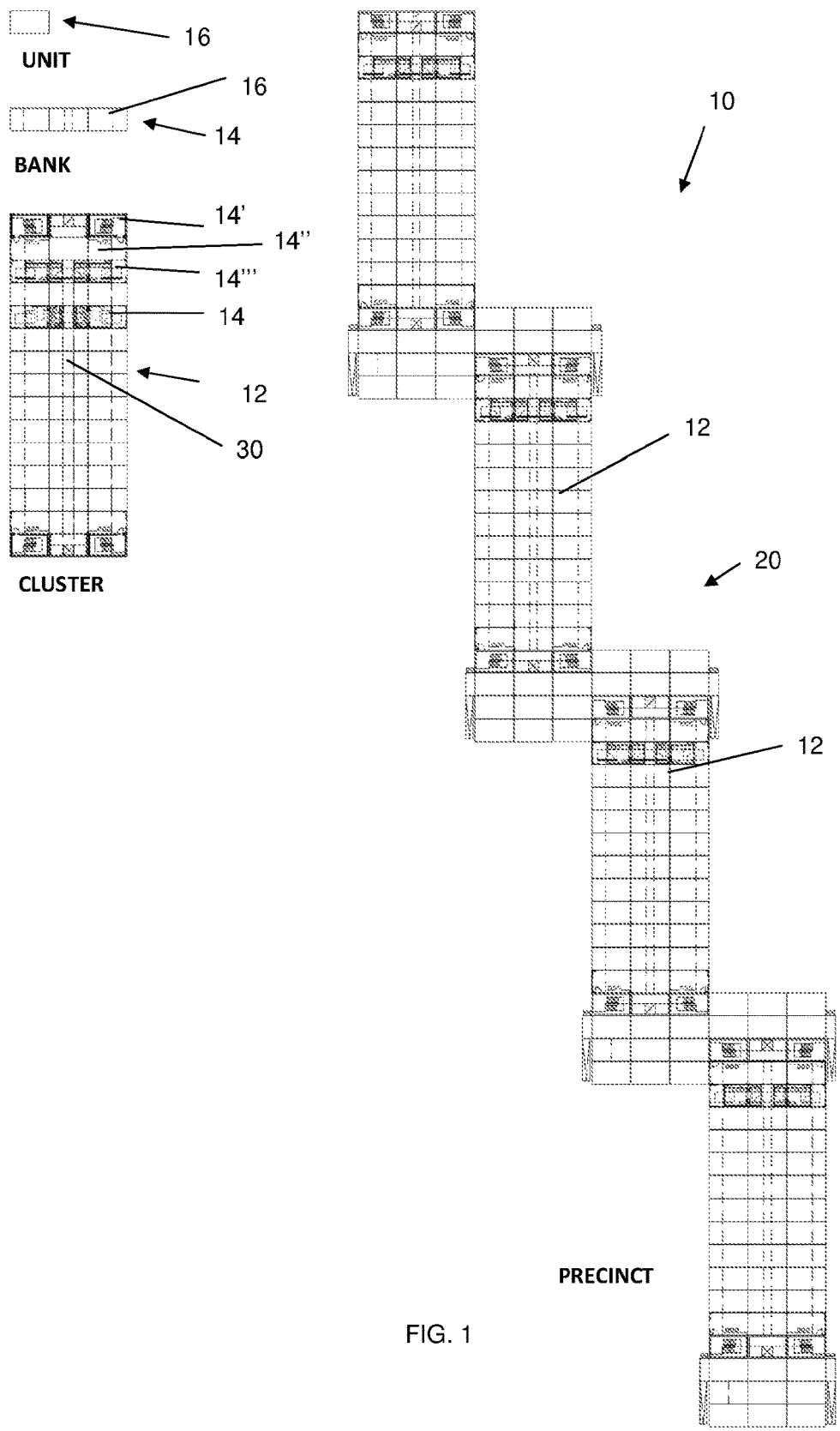
FIG. 1 is a schematic set of plan views showing a building unit and a building according to an embodiment of the present invention.
Figure 2A:
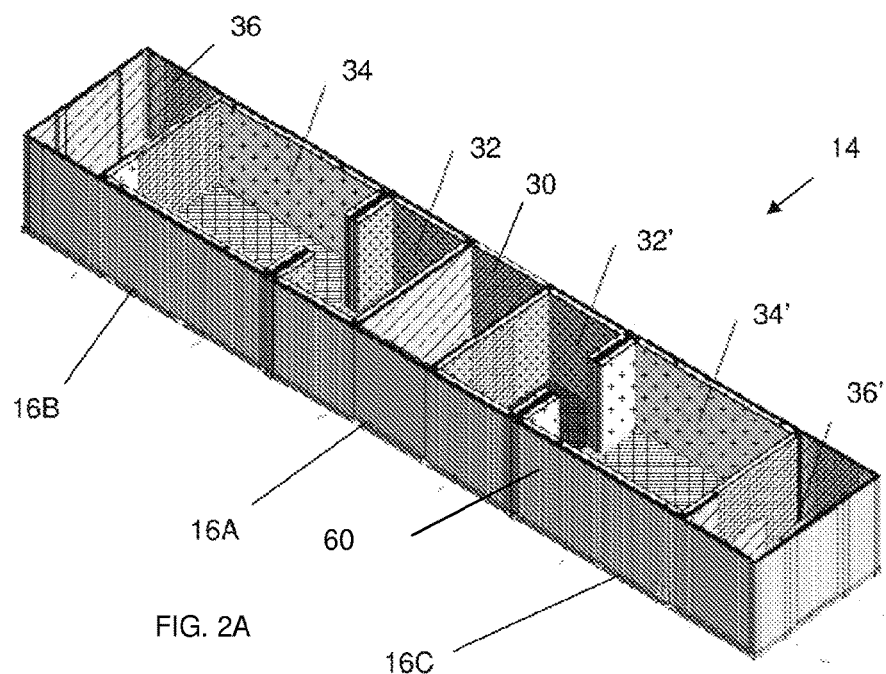
FIG. 2A is an upper isometric view of a bank of modular building units of the building of FIG. 1, with a roof removed.
Figure 2B:
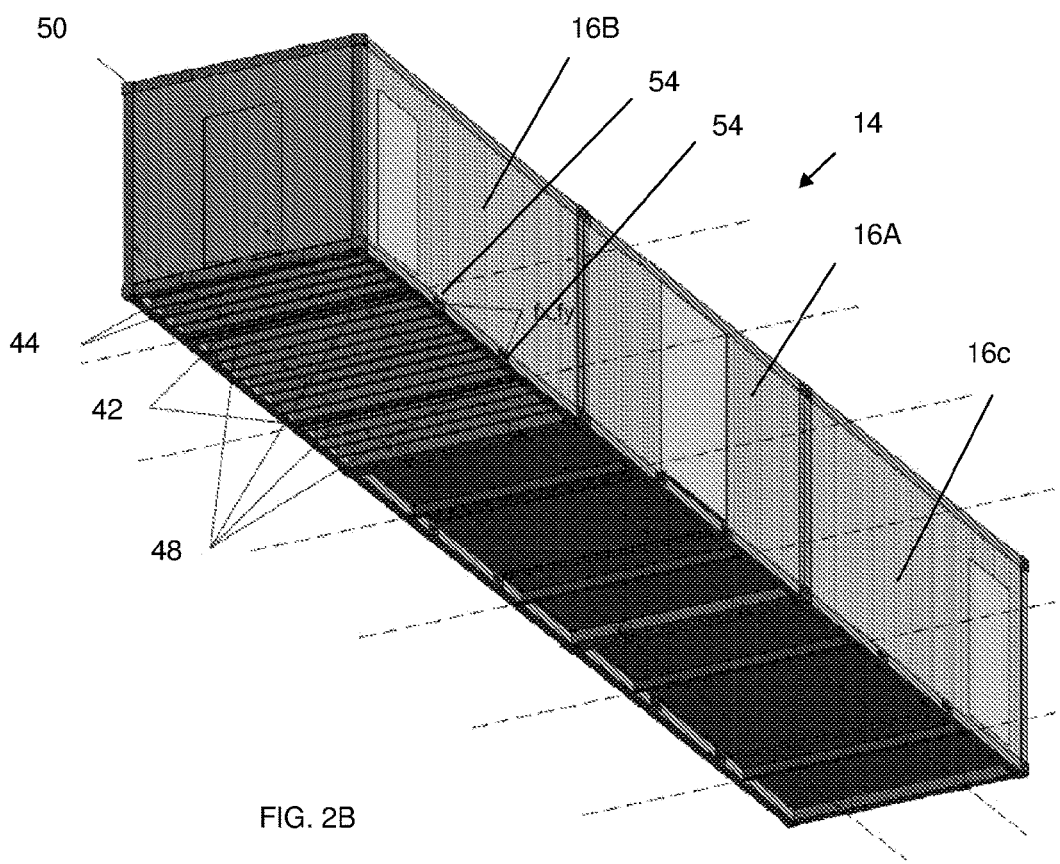
FIG. 2B is a lower isometric view of the bank of FIG. 2A.
Figure 2C:
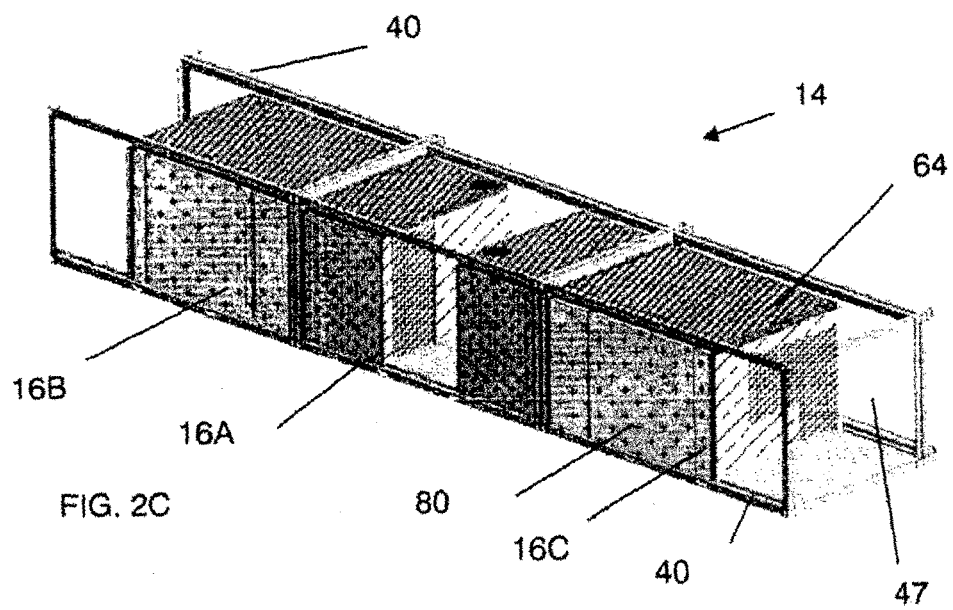
FIG. 2C is an upper isometric view of a bank of modular building units of the building of FIG. 2A, with a removable skin removed.
Figure 2D:
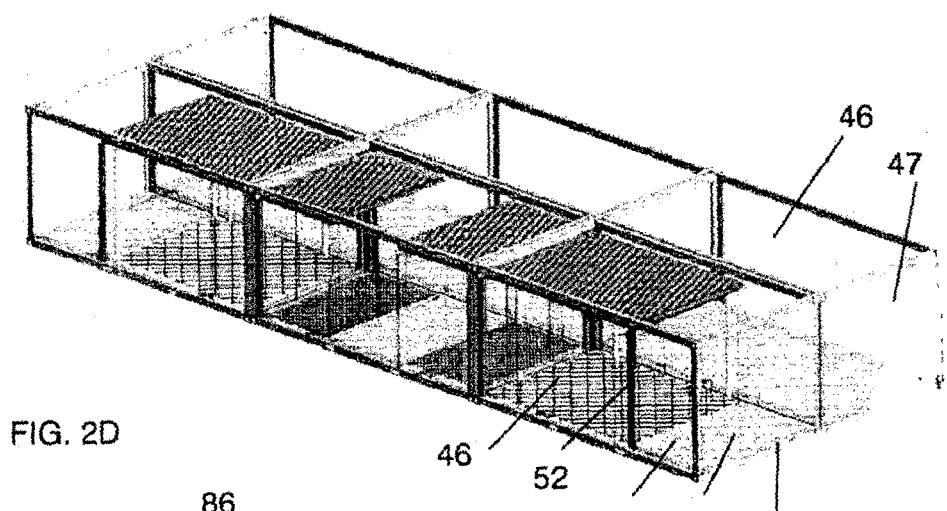
FIG. 2D is an upper isometric view of a bank of modular building units of the building of FIG. 2C, with internal walls being shown in ghost form and with another bank of modular building units adjacent with no internal walls or roof and a removable skin removed.

Referring to FIG. 1 there is shown a building 10 according to an embodiment of the present invention. The building may be for example a mine site accommodation village, a hotel, hospice or offices.

Figure 22:
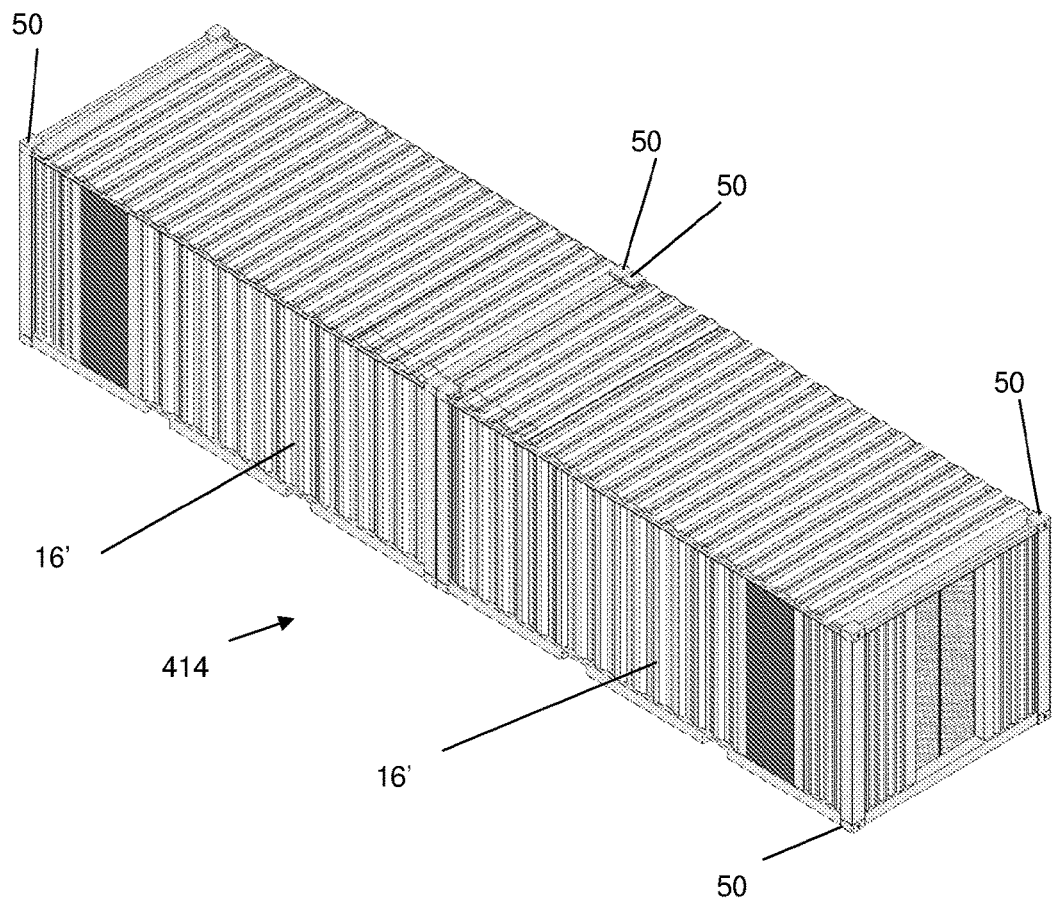
FIG. 22 is an upper isometric view of a bank of modular building units according to an embodiment of the present invention.
Figure 23:
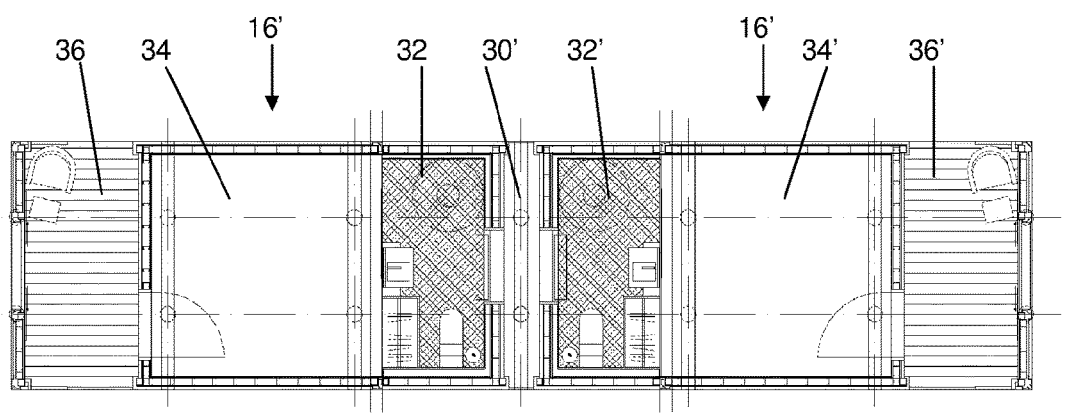
FIG. 23 horizontal cross-sectional plan view of the bank of FIG. 22.
Figure 24:
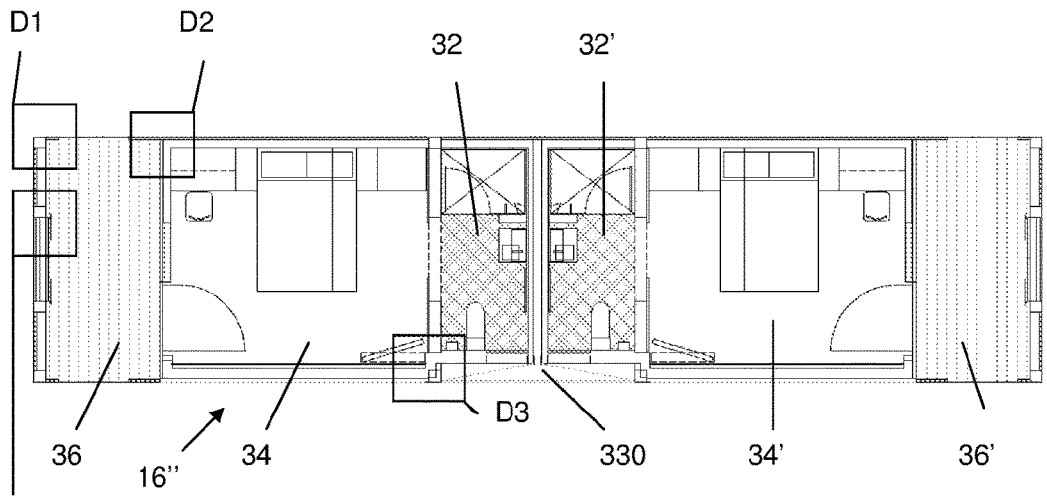
FIG. 24 horizontal cross-sectional plan view of a modular building unit according to an embodiment of the present invention.

The building 10 comprises one or more clusters 12. In this embodiment a cluster comprises a plurality of similar usage areas. For example in an accommodation complex a living quarters may comprise usage areas that may be bed and bath rooms. The cluster comprises a plurality of banks 14, 14', 14", 14''' of modules. A bank 14 of modules comprises one or more modular building units 16. In this embodiment every unit in the bank, and preferably in the cluster, has the same dimensions. In this embodiment each bank 14 comprises three units 16 positioned end to end. Thus each bank has the same dimensions. In an alternative embodiment (such as is shown in FIGS. 22 and 23) the bank comprises two units end to end. In yet a further embodiment the bank is a single building unit (such as is shown in FIG. 24).

Further in this embodiment each bank 14 comprises a mirrored usage area on each side of a corridor 30. For example each bank 14 may comprise living quarters on each side of the corridor 30. In an alternative or in addition a bank 14 may comprise a plurality of units 16 side by side. In this embodiment each cluster comprises a plurality of (in this case fifteen) banks 14 in a side by side arrangement. Further the cluster 12 comprises different types of banks 14', 14" and 14''', each with a different usage, on either side of the plurality of banks 14. In this embodiment the banks 14' comprises a vertical access unit, such as a stair way or elevator. In this embodiment the clusters are offset and connected to each other by a cluster connection portion 20.

In an embodiment each unit is of a unit type and each unit is configured according to its unit type. In an embodiment the configuration comprises one or both of internal wall configuration and external (perimeter of the unit) wall configuration. In an embodiment each bank is of a bank type, where each bank type is defined according to the unit types of its units.

A bank 14 is shown in more detail in FIGS. 2A to 2D. In this embodiment the bank 14 comprises unit 16A, which comprises a service corridor 30 and service entries to bathrooms 32 and 32'. On either end of unit 16A is units 16B and 16C, each of these comprise a bedroom 34/34' and veranda or private balconies 36/36'. A doorway 56 leads from room 34' to the bathroom 32'. In an alternative the corridor may be a hallway corridor and rooms 32 and 32' are entries and rooms 36 and 36' are bathrooms.

Figure 3:
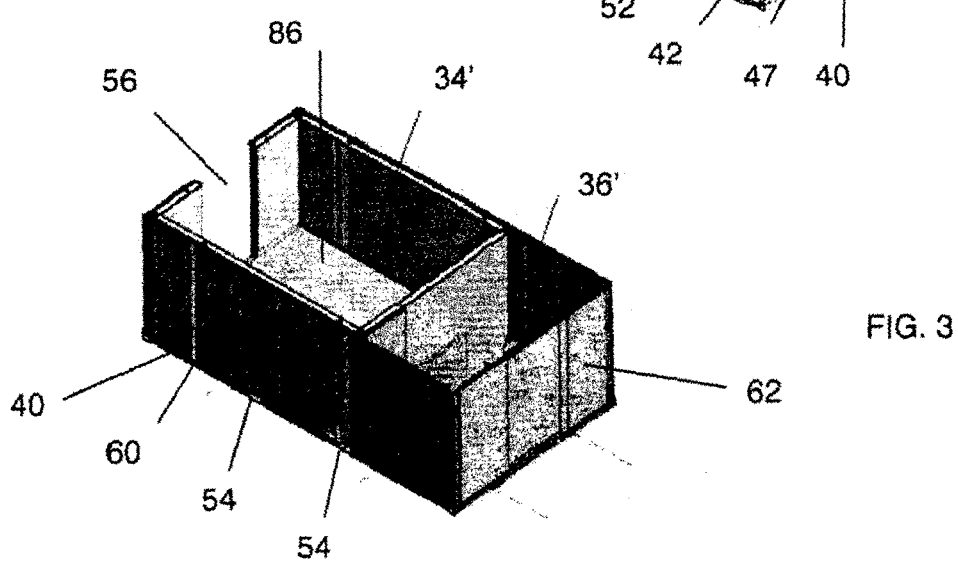
FIG. 3 is an upper isometric view of a modular building unit of FIG. 1, with the roof removed.
Figure 4:
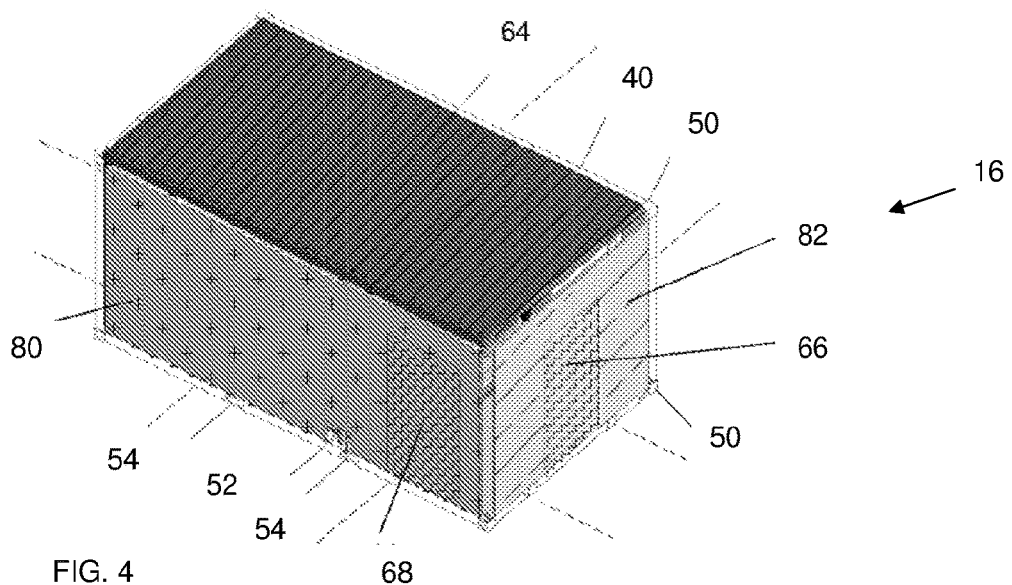
FIG. 4 is an upper isometric view of a modular building unit of FIG. 3, showing a ceiling and internal walls resulting from a removal of external wall panels.
Figure 5:
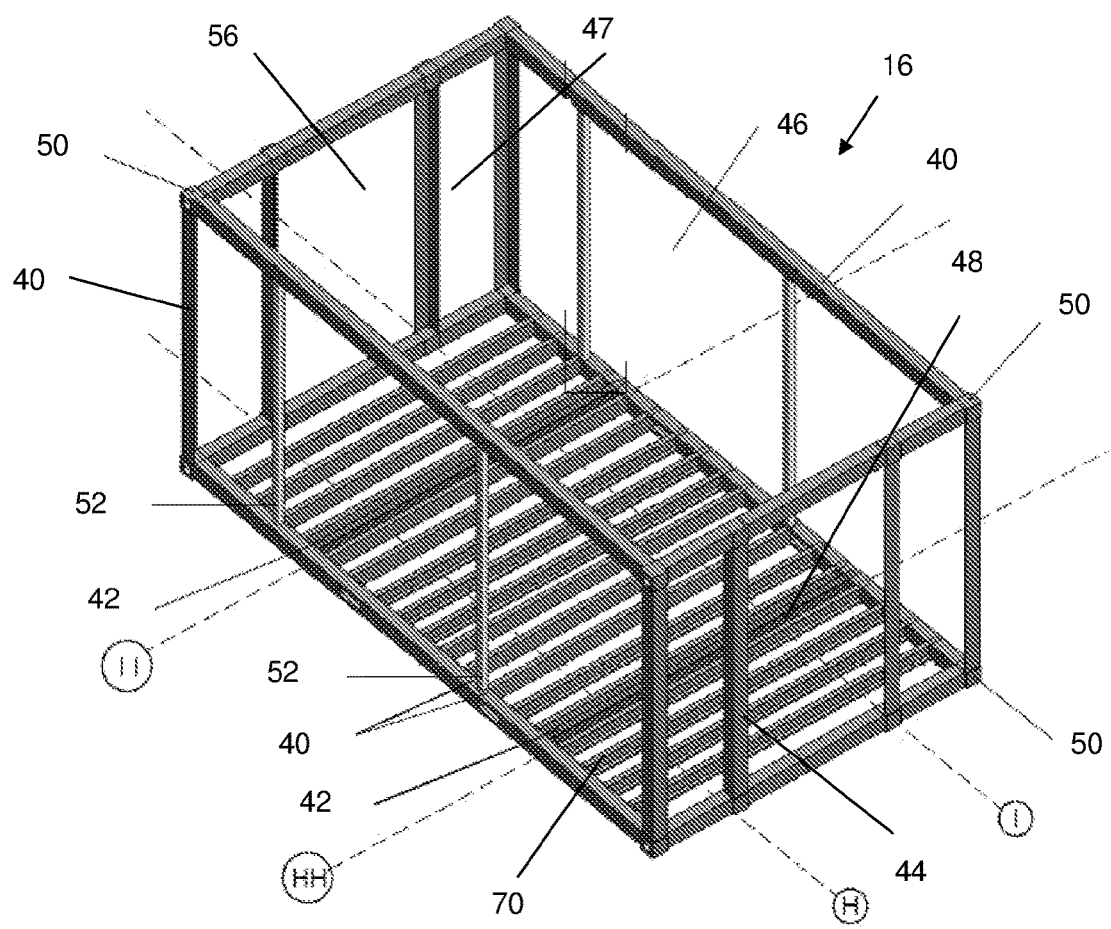
FIG. 5 is an upper isometric view of a frame of the modular building unit of FIG. 3.

Also referring to FIGS. 3 to 5, each unit 16 comprises a structural frame 40 in the shape of a rectangular prism. In an alternative form the structural frame 40 is in the form of a rectangular table shape, comprising a rectangle and four legs, each extending from one of the corners of the rectangle. Typically the rectangle will be at the base of the building unit and the legs will extend vertically. In such a case it will be typical to have another rectangle of another building unit joined at the corners such that the other rectangle and the structural frame form a rectangular prism.

Typically the frame 40 is formed of steel beams, however in an embodiment the frame 40 is formed of Fibre-Reinforced Polymer (FRP) (also known as Fibre-reinforced plastic) beams fixed together by bonding and or mechanical coupling.

FRP is a composite material formed by reinforcing a polymer matrix with fibres, typically glass fibres (fibreglass) or carbon fibre or aramid fibre. The polymer is typically a thermoset or thermoplastic resin. The fibres are generally oriented to provide strength and deformation resistance as required by the member formed of FRP. In the case of a beam the fibres are oriented for load bearing and resistance to longitudinal deformation. FRP beams are connected to form the frame by removing any residual mould release agent on the site of the connection point, applying a structural adhesive and or fixing with a mechanical coupling, such as bolting the beams together or to a common connection member, such as a corner 50.

The inside of the prism 56 will be a portion of the inside of the building, when constructed. Longitudinally disposed end faces of the frame have vertically extending support members 44. In an embodiment the support members 44 are formed of steel, however in an alternative embodiment they may be formed of FRP beams. The longitudinal frame members have removable supports 52 extending vertically between them, which are used during transport of the unit and may be retained in suitable positions to provide additional support strength to the structure. However these supports 52 may also be removed leaving open the space 46 between the top and bottom longitudinal frame members. This enables an area in the building to be larger than would otherwise be available when the walls are removed leaving open space 46 leading to the inside 56 of the unit 16. A bottom face of the frame has transverse support members 42 in the form of beams. The top face of the frame may also have transverse support members. The support members 42 allow the floor of the unit to support sufficient weight and can also be used to mount a bottom level to a ground support/mounting system or to a level of units beneath. Transverse members 70 extend between the longitudinal horizontal bottom frame members 40 and support a floor 86.

For transport, and if desired to be used in the assembled building, the faces of the prism may have outer side walls 60 and end walls 62, as seen in FIG. 3. In one embodiment an internal side wall 80 and or an internal transverse wall 82 are provided inside of an outer wall and inside of the frame 40, seen in FIG. 4. Outer walls 60 and 62 are not shown and frame 40 is ghosted in FIG. 4 so that the internal walls 80 and 82 can be more clearly seen.

In an embodiment the internal walls 80/82 may be configured as required to define a room or rooms or part of a larger room in the unit. The outer wall 60/62 is a skin preferably suitable for transport of the unit in a weather exposed condition. In an embodiment the outer wall 60/62 is formed of one or more panels of weathering steel, such as Cor-ten™ or in an alternative form of FRP. In an embodiment the outer wall 60/62 is removable after transport or retained as a weather resistant outer wall in the building or as a structural member fixed to and supporting the load bearing capacity of the frame. The internal wall 80/82 (shown in FIG. 6 with the side wall 60 not shown) may also provide structural integrity to the unit 16, particularly to support loads in combination with the frame when used in a multi-storey configuration or when used in cyclone prone areas. "Cyclone" is a term used in Australia to refer to a severe tropical storm and has the same meaning as the North American term "hurricane". In this embodiment the internal wall 82 is behind end walls 62. The units 16 may also have an internal ceiling 84 and a top surface skin 64 comprised of the same whether resistance material as the side wall 60 for transport. This may also be retained in the building 10.

The external skin 60/62 and or internal walls 80/82 may be formed of a panel comprising a sheet of FRP finished with a decorative appearance on a surface prior to installation in the unit, such that the surface will be displayed when installed in the unit. Such a panel will have application in buildings other than in the modular building unit described herein. The panels will have securing points, such as holes, for bolting or screwing to the frame or other structure of the building.

For transport the corners 50 of the unit 16 may have attachment points for lifting the unit to and from a transport vehicle, such as a truck, rail car, or ship, and for positioning in place in the building 10. The attachment points are in the normal form of "castings" using for shipping containers, although in an embodiment these are formed of FRP and may be integrally formed with the vertical edge members of the frame 40 or the longitudinal members of the frame 40. In the sides of the lower longitudinal frame members 40 there are fork pockets 54 for receiving tines of a forklift, the same as is a normal shipping container.

Transverse dashed lines II and HH extend through the beams 42. They intersect at 48 with longitudinal dashed lines I and H. These lines allow a grid to be used in the design of the building and are spaced ¼ of the width/length of the unit in from the edge of the unit. In this embodiment they extend through the intersection of vertical supports 44 with the end bottom structural members 40. In an embodiment the vertical supports are about 2.4 m apart. They are also removable to allow a clear opening 47. Generally the opening 47 will be internal to the building, with loads distributed to and through the frame and in some cases the structural wall panels 80/82 and panels 60/62.

The beams 42 are positioned inwardly of the respective ends of the frame 40, ideally about a third to a quarter of the length of the frame 40. The beams 42 should be positioned outwardly of the fork pockets 54, which are generally about 2 m apart.

The vertical supports 44 are positioned inwardly of the edges of the frame 40, ideally about a quarter of the width of the frame 40. In an embodiment the supports 44 are about 0.5 to 1 m and preferably about 0.486 m from each edge.

The vertical supports 52 are positioned inwardly of the edges of the frame 40, ideally about a quarter to a third of the length of the frame 40. In an embodiment the supports 52 are about 2 m from each edge. Each of the supports 52 need not be positioned inwardly from the edge by the same distance. This is the case in FIG. 5. They may be positioned to provide a structure to fix internal walls to.

In an embodiment a diagonal brace may be provided on the side faces of the frame 40 for transport. Such bracing may also be used in the internal walls 80/82 and ceiling panels in the roof 84 and in the floor 86.

Figure 17:
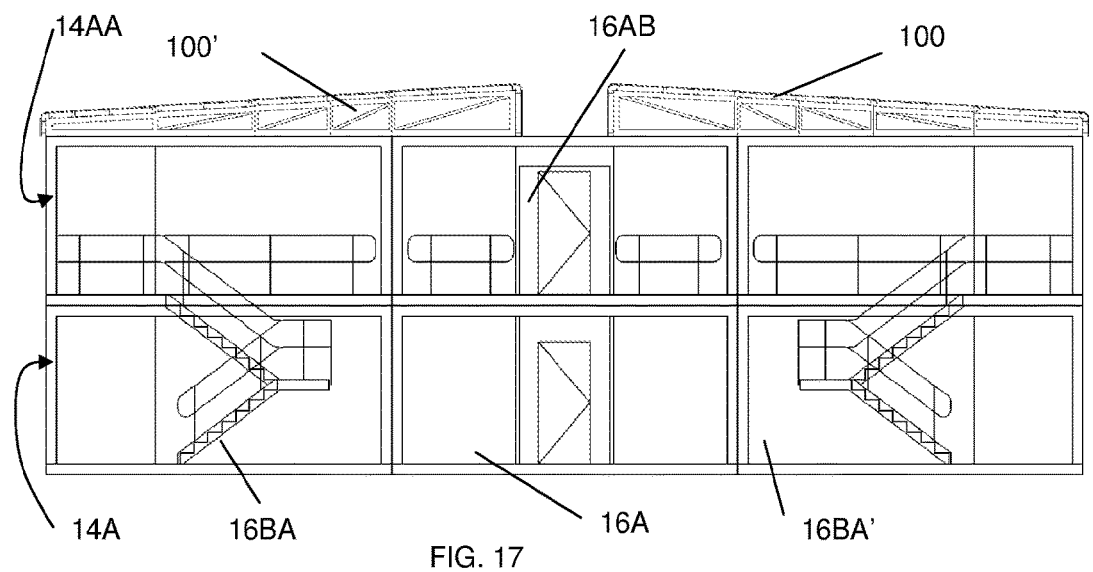
FIG. 17 is an end view of a cluster of the building of FIG. 1.
Figure 18:
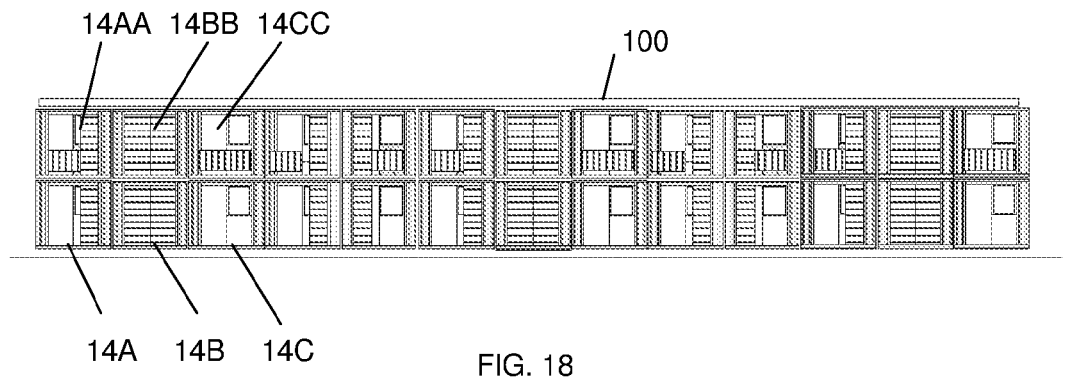
FIG. 18 is a side elevation of the cluster of the building of FIG. 6.

In an embodiment a portion of or the whole of the building is multistorey. In the embodiment shown in FIGS. 17 and 18 there are two stories. As shown, banks 14A, 14B and 14C each have respective banks 14AA, 14BB and 14CC on top so that there are two storeys. Bank 14A has end corridor unit 16A with a door to the exterior of the building or to an access-way in bank 14A prior to lower stair well units 16BA and 16BA'. Above unit 16A in bank 14AA is an end corridor unit 16AB with a door to the exterior of the building and a hand rail. A top part of the stair well units 16BA and 16BA' is in bank 14AA. A unit may be two storeys high. A roof is in two parts 100 and 100' and spans bank 14AA. Each part 100 and 100' is longer than the respective end building unit and partly covered unit 16AB.

Figure 6:
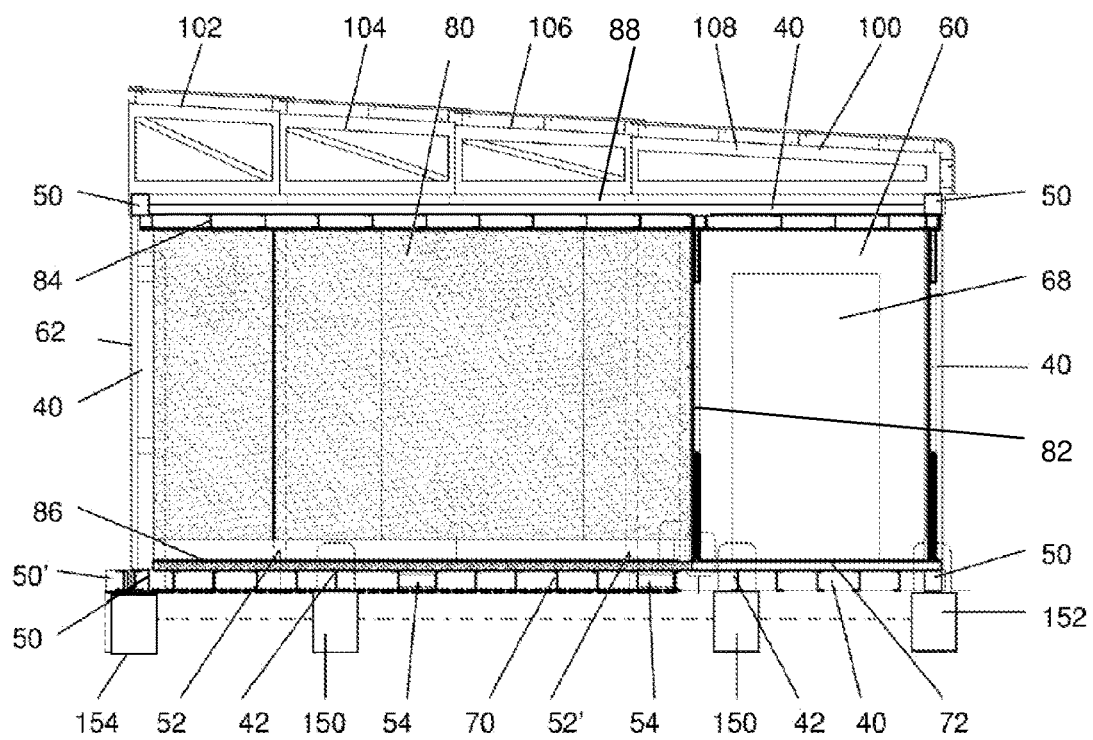
FIG. 6 is a partial cross sectioned side elevation of an embodiment of a modular building unit of the present invention.
Figure 6A:
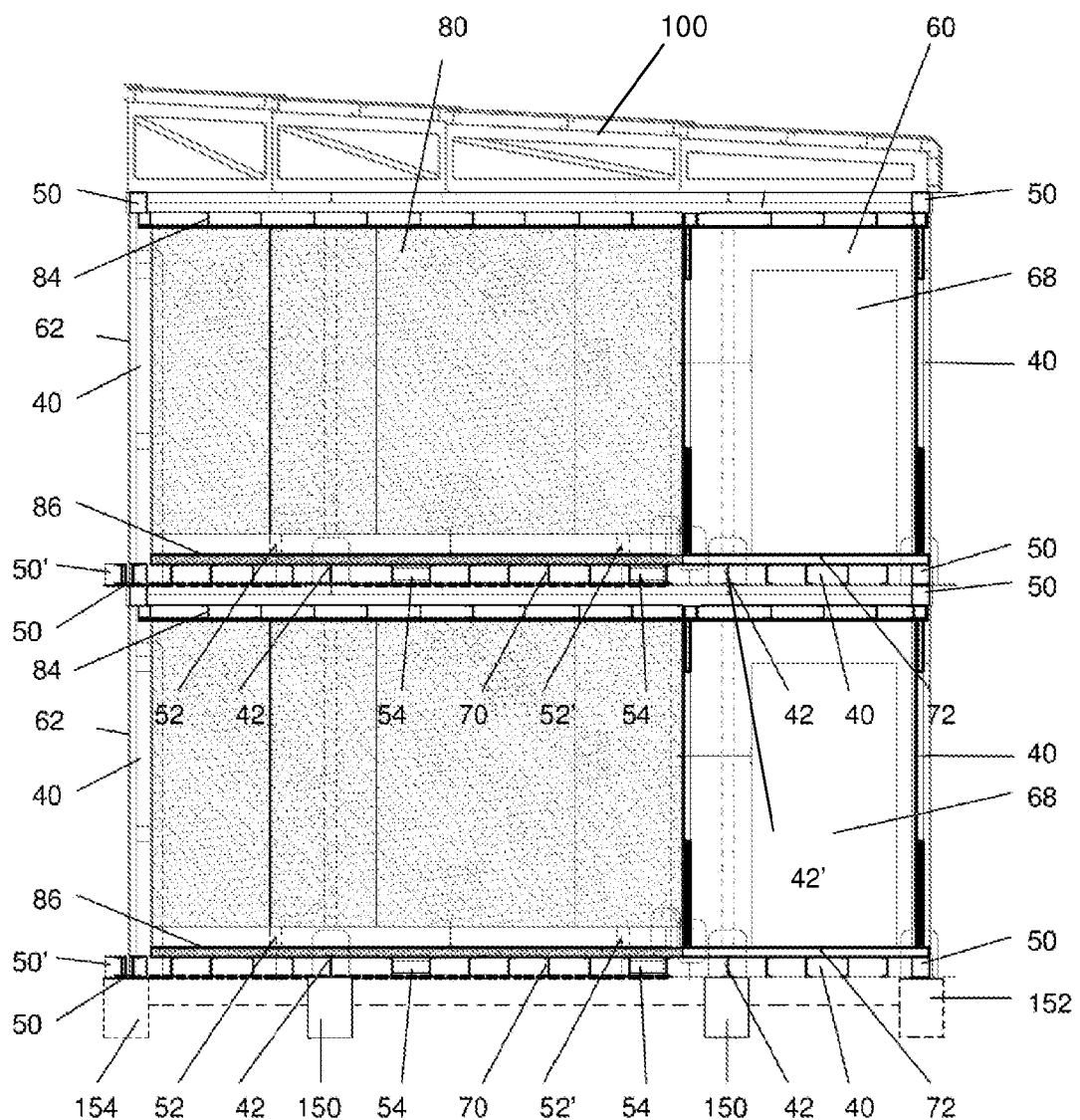
FIG. 6A is a partial cross sectioned side elevation of an embodiment of two modular building units of the present invention stacked one on another.

Referring to FIG. 6 an embodiment of a building unit is shown mounted to footings 150, 152 and 154. In an alternative a slab may be used as well as or instead of the footings. The transverse beams 42 are inward of the ends of the building unit and are fastened to inner footings 150, the bottom attachment points 50 on the exterior are fastened to perimeter footing 152 and the bottom attachment points 50 on the interior of the building, along with the attachment points 50' of an adjacent building unit are fastened to footing 152 by two C channels. In an embodiment the footings 150, 152 and 152 are pile footings above ground level. In an alternative they may be at or below ground and in a further alternative, instead of footings there may be vertical posts or screw piles. In yet a further alternative, instead of footings there may be attachment points to a building unit underneath, as shown in FIG. 6A. It is desirable for the beams 42 have a suitable flanged surface with a hole or holes therethrough to be bolted in place.

There may be correspondingly positioned beams 42' on the top face of the frame for attachment of beams 42 in a building unit stacked on top. Beams 42 and 42' may provide structural reinforcement of the frame, including resistance to torsion through the length of the building unit.

It can be seen in FIG. 6A that the corner attachment points 50 between the stacked units sit on the other and are able to be fastened together. Further the transverse beams 42 in the upper unit are able to sit on the longitudinal members of the frame 40 and/or other longitudinal channel members 88 (such as C channels) fastened to the frame 40. In an embodiment the members 88 may be formed of FRP.

In this embodiment the building unit has spaced apart oppositely directed monopitch-like roof part 100 fastened to top longitudinal members of the frame 40 and/or other the longitudinal channel members 88. The roof part comprises abutting roof portions 102, 104, 106 and 108 with an overlap 124 in a top drainage sheet 114. There may be other portions not shown in FIG. 6. Each portion may be progressively longer in a horizontal dimension than the previous and shorter in height than the previous. In an embodiment the width (into the page) of the roof portions is smaller than the width of each building unit. In an embodiment each roof portion is ½ or ⅓ the width of the building unit, such that 2 or 3 panels of the same type sit side by side on the top wall 64 to cover the width of the building unit.

Figure 7:
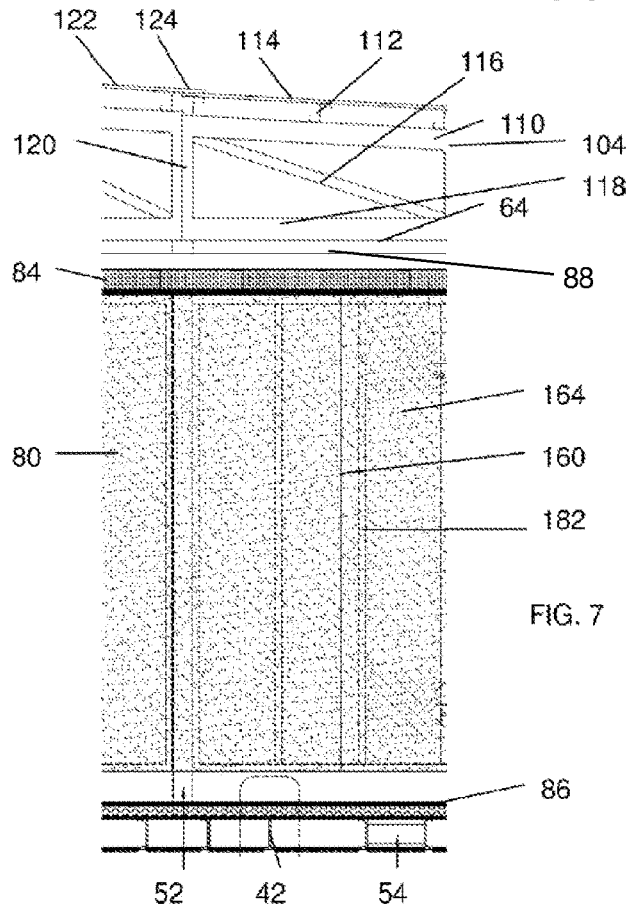
FIG. 7 is an enlarged portion of the building unit of FIG. 6.

Referring to FIG. 7, in an embodiment, the roof portions are formed of a sloping truss or frame with a bottom horizontal beam 118 being a joist, a top horizontal beam 110 being a rafter and S-shaped sections 112 being battens onto which is fastened a roof sheet 114. There are vertical beams 120 at the end of each truss, which abut between adjacent portions and may be fastened together. It can be seen that the taller portion 102 has its roof sheet 122 overlap sheet 114 at 124 to ensure proper progressive run-off of water from the roof 100. In an embodiment the roof portions or parts thereof, including the beams 110, 118, 120, 116 of the truss and roof sheet 114 are formed of, for example, extruded aluminium and steel roof sheets or FRP beams/panels or as an integrally moulded FRP member.

Also shown in FIG. 7 an insulated wall 80 has service conduit 182 installed for use by electrical cables or plumbing services. In an alternative or in addition service access skirting may be provided between the inner wall 80 and the floor structure 86.

Figure 8:
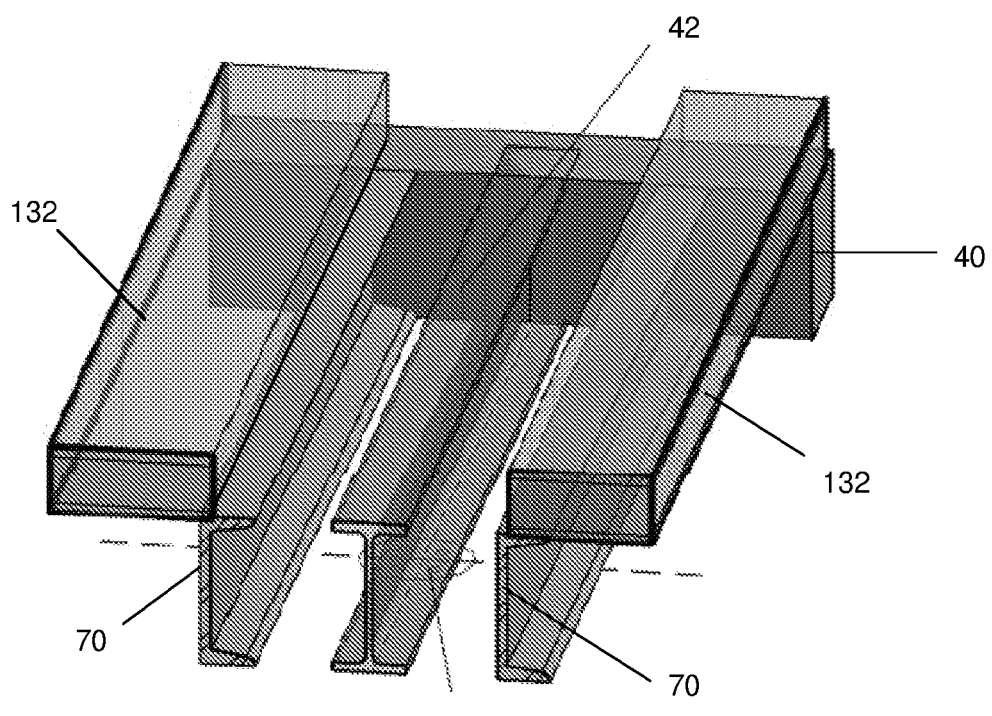
FIG. 8 is a cross sectioned perspective view of an embodiment of a transverse beam of the building unit according to the present invention, with a removed portion of a floor structure to allow access to the transverse beam.

Referring to FIG. 8, the transverse beam 42 is shown in more detail. The beam is an I beam in one embodiment or two back to back C channels in another embodiment. The beam 42 is preferably welded, bonded and or mechanically coupled (such as by bolting) to the longitudinal bottom frame member 40. The beam 42 has fastening holes 130 for fastening the beam 42 to the footings 152, or to another building unit beneath. Also shown are transverse C channel cross members 70 extending between the longitudinal horizontal bottom frame members 40. In an embodiment the cross members are formed of steel or FRP. Also shown are floor member(s) 132 which form a floor 86. An access panel covering a fixing point of the beam 42 is removed. Fixing the beam 42 to footings allows transfer of load from the frame to footings additional to those at each end.

Figure 9:
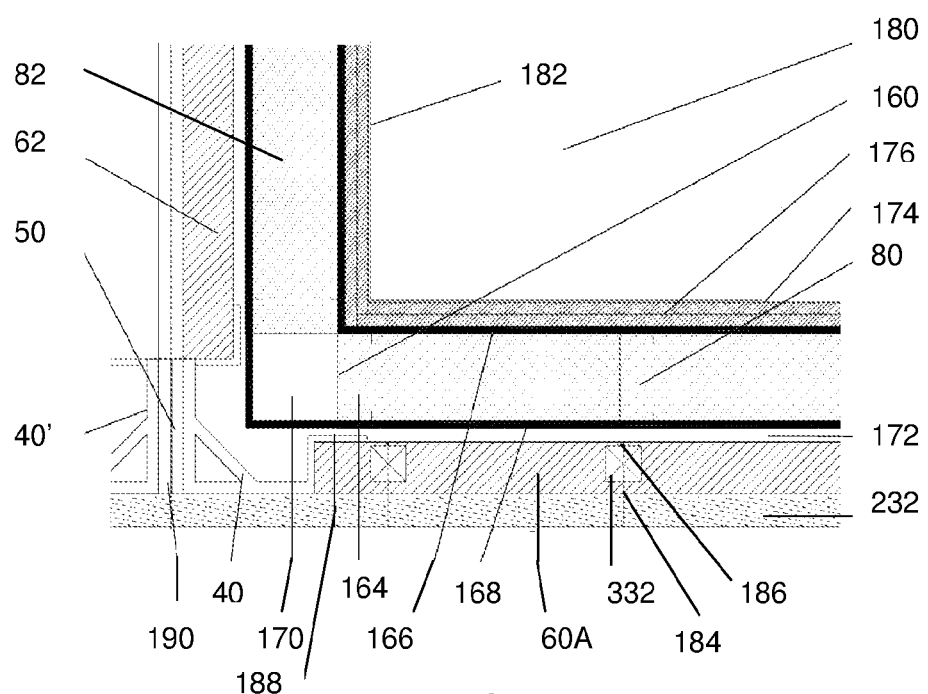
FIG. 9 is a horizontal cross section of an embodiment of a corner of the building unit according to the present invention.

Referring to FIG. 9, a corner of the building unit showing an insulated internal wall 80 is shown joined to internal wall 82. The wall 80 is comprised of a frame, such as a light steel frame 160 with an insulating material 164 in between panels of magnesium oxide cement board or plasterboard, FRP panels or the like. The wall may be certified for cyclonic conditions and or may be fire retardant. Thermal-break sheets 166 and 168 may be provided on either side of the frame 80. A light steel vertical member 170 sits within the frame 160 inside the corner post 40 such that a gap 172 is provided between the internal wall 80 and the side wall 60' and end wall 62. The member 170 is also fastened to the longitudinal frame members and if applicable the vertical members 52. The internal wall 80 has vertically extending steel studs regularly spaced along its length. A typical example spacing is 300 mm. A lining 182, such as wall paper, or laminate may be applied to an internal wall cladding 174, which in turn may be applied to a water resistant sheet 176 for wet areas, such as bathroom or laundry. Variations to the wall structure are described in relation to FIGS. 13 to 16.

The walls 80/82 may be constructed in a manner that would enable them to receive a cyclone resistant rating as if they were not to be inside the frame. This enable the building unit to have the structural integrity of a cyclone rated structure internal to the frame, notwithstanding the increased structural integrity provided by the frame and or the wall 60/62.

Also shown there is a connector 190 connecting the connection points 50 of corner post 40 and a corner post 40' of another building unit.

The wall member 60A in this embodiment is different to the wall member 60 in other embodiments. It has columns 332 recesses for receiving fixing members 184 and holes 186 for attachment of an aesthetic external cladding 232. The wall 60A may be bolted to the frame 40 by bolt 188. The external cladding may be a sheet of FRP.

Figure 10:
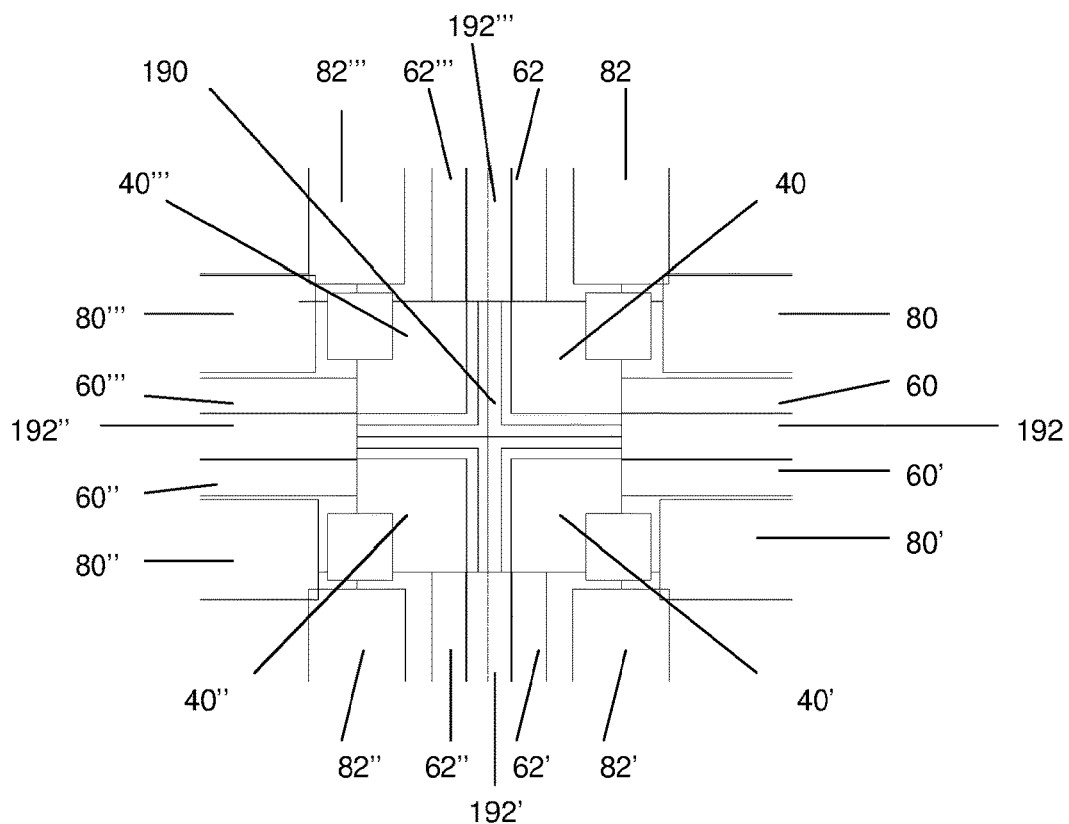
FIG. 10 is a horizontal cross section of an embodiment of an internal corner of the building unit according to the present invention.

FIG. 10 shows a similar structure at a corner of four units. There is an air gap 192 between wall members 60 and 60'. When adjacent wall members 60 or 62 are removed the air gap 192 may be used for services.

Figure 11:
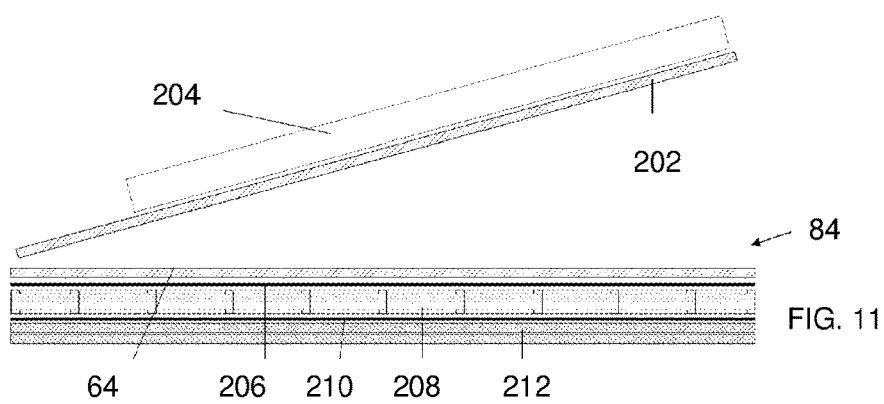
FIG. 11 is a vertical cross section of an embodiment of a roof section of the building unit according to the present invention.

Referring to FIG. 11, there is an embodiment of a ceiling structure 84 comprising a top panel 64, which is typically formed of a weathering steel or an may be formed of a FRP panel. In an embodiment, underneath is an internal insulating ceiling panel 208, preferably separated by an air gap. In an embodiment this ceiling panel is formed of a stud frame with thermal insulating material between the frame studs, where required service ducts or conduits are provided. The ceiling panel is typically fixed to the frame and increases the structural integrity of the frame. In an embodiment on one or both sides of the stud frame is a sheet of insulating material, such as an air-cell aluminium foil 206 and 210, which acts as a thermal break. In an embodiment underneath the panel 208 is a decorative cladding 212, which is typically fire proof, such as magnesium oxide cement panels, or a FRP panel. The panel 212 may be acoustically dampening, by for example being provided with sound cancelling perforations.

In an alternative to decorative cladding 212 there may be battens for a suspended ceiling.

In an embodiment on the roof there is a profiled sheet metal panel 202 on hinges which is held by brackets at an optimal angle so as to support a solar panel 204. Alternatively a solar panel may form part of a roof panel.

Figure 12:
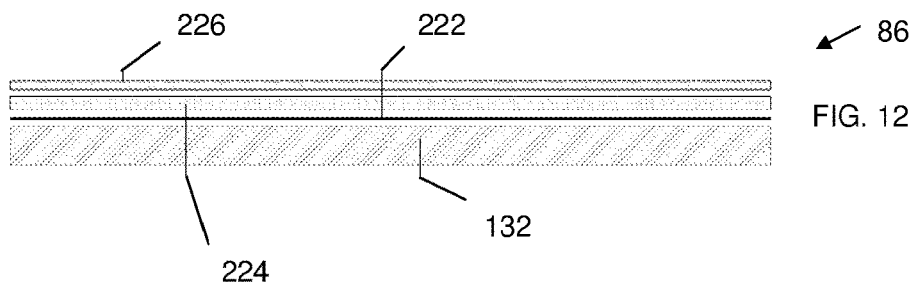
FIG. 12 is a vertical cross section of an embodiment of a floor section of the building unit according to the present invention.

Referring to FIG. 12, there is an embodiment of a floor structure 86 comprising a bottom panel 132, which is typically formed of weathering steel or a FRP panel fastened to the cross members 70. In an embodiment, on top of this is a sheet of waterproof insulating material, such as an air-cell aluminium foil 222, which acts as a thermal break. In an embodiment on top of this is a metal insulated panel 224, such as a 50 mm polystyrene core with 0.5 mm powder coated sheet metal on each side or concrete waffle beams. On top of this is a Compressed Vinyl Composition floor 226. Other floor surfaces may be used as alternatives, such as tiles, wood or carpet.

Figures 13, 14, 15, 16:
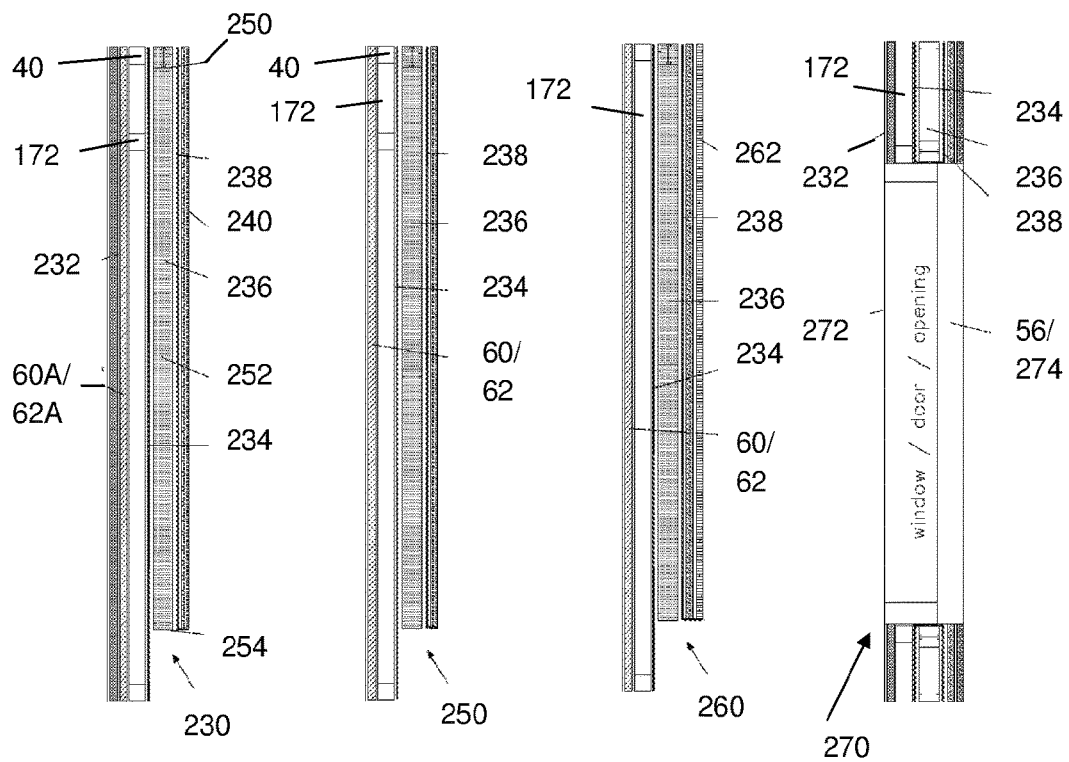
FIG. 13 is a vertical cross section of an embodiment of a wall section of the building unit according to the present invention.
FIG. 14 is a vertical cross section of an embodiment of a wall section of the building unit according to the present invention.
FIG. 15 is a vertical cross section of an embodiment of a wall section of the building unit according to the present invention.
FIG. 16 is a horizontal cross section of an embodiment of a wall section the building unit having a window of according to the present invention.

Referring to FIG. 13, an embodiment of an external wall 230 of the building is shown. In this embodiment an optional external cladding 232 is applied to the external side of a panel 60A or end 62A, such as by use of the fixing members 184 and holes 186. On the internal side is an insulating wall panel 236, such as panel 80. In an embodiment the panel is formed of a stud frame with thermal insulating material 252 between the frame studs 250. Where required, service ducts or conduits are provided in the panel 236. In an embodiment on one or both sides of the stud frame is a sheet of waterproof insulating material, such as an air-cell aluminium foil 234 and 238, which acts as a thermal break. In an embodiment on the inside surface is a decorative cladding 240, which is preferably fire-proof, such as a magnesium oxide cement board or an FRP panel. This cladding may have a decorative image applied to the displayed surface.

The panel 236 has a bottom edge 254, which sits on the bottom longitudinal member of the frame 40. The cladding 232 and side/end 60/62 extend down further as they cover the full side of the building unit 16.

Referring to FIG. 14, an embodiment of an internal wall 240 of the building is shown. This wall will be on the exterior of a building unit, but will become an internal wall of the building when the building is assembled form the building units. It has a similar construction to wall 230 except that the cladding 232 is not included. Optionally side/end 60/62 may be removed. Typically this internal wall 240 will face a similar mirrored internal wall of the adjacent building unit.

Referring to FIG. 15, an embodiment of an internal wall 260 for a "wet-area" is shown. A wet area is an area that has water services, such as bathroom, laundry, outdoor barbeque area or kitchen. It has a similar construction to wall 230 except that the cladding 232 is optionally not included. Optionally side/end 60/62 may be removed. In addition there is a water resistant cladding 262 on the inside most surface. This cladding 262 may be a FRP panel.

Referring to FIG. 16, an embodiment of an internal wall 270 with an opening is shown. It has a similar construction to wall 260 except that an opening 56 is provided in the wall, which may have a door or a window 274. In an embodiment the window is a powder coated or vinyl wrapped double glazed sliding window with thermal break frame 272. In an embodiment this wall section may be used a wall to a veranda area. In an alternative this wall 270 may be an external wall, in which case the side/end wall 60/62 may be present, and optionally external cladding 232 may be included if it is exposed to the outside atmosphere. The external cladding 232 may be a weathering steel or FRP panel 60/62 and may have a decorative finish applied to the displayed surface.

It is preferred that the insulation material is fire resistant, such as for example stone/rock wool insulation, although other layers, such as the sheet/skin 60/62, or the magnesium oxide cement board 212/238 also serve as a fire resistant layer. It is also preferred that this layer also have water and mould resistance properties and acoustic insulating properties.

The opening 56 may have a cyclone rated shutter installed, which when installed with wall 62 in the opening from the veranda to the exterior of the building 10, allows the veranda, which is internal to the frame 40 to become cyclone rated.

In an embodiment the veranda deck comprises a rail or balustrade along one of the faces of the building unit.

In an embodiment the veranda deck is open to a veranda deck of an adjacent building unit in use.

In an embodiment a wall partitioning the veranda deck from a room in the building is insulated. In an embodiment an enclosure of the veranda deck is uninsulated.

The internal walls 80/82, ceiling panel 208 and floor structure 86, excluding bottom panel 132, may be constructed, with services installed, as one or more internal modules, which are in turn installed in and fixed to the frame 40.

The internal walls 80/82, internal ceiling panels 208 and floor structure 86, excluding bottom panel 132, may in a box structure having a suitable structural integrity as if the frame 40 were not present. This may allow for the building unit 16 to have a weather rating at least equivalent to the rating the equivalent structure would have without the frame 40.

For ease of transport, advantageously the rectangular parallelepiped structural frame 40, with the walls 60 and 62, can be handled as a shipping container. More advantageously the frame can be overwidth, wherein the width of the frame is of at least 2.4, preferably 2.6 m to 4.2 m, more preferably about 3.3 m (11') to 3.5 m and most preferably 3.4 m.

In an embodiment the length of the frame is about 6 m, 6.8 m, 7.2 m, 12 m, 14.4 m, 18 m or 36 m. In an embodiment the height of the frame is the size of a HQ container, which is about 2.9 m in height. In an embodiment a tall container is of a height of 5.8 m (19'). In an embodiment each container is of a height of about 3.12 m or 3.48 m. In an embodiment each tall container is of a height of 6.24 m, 6.96 m or 8.7 m.

The air cavity between the external wall 60/62 and the internal wall 80/82 means that the external walls of container may not need to be totally waterproof and the external walls 60/62 can be bolted, (or if steel spot welded) for cost savings. Further the units do not needing to go into a floatation tank to see if they are totally waterproof. There is also the flexibility of optionally removing the exterior wall 60/62 on location according to the design if the building, a well as, future replacement if transported again. It is desired that the top exterior panel 64 be waterproof for transport.

Figures 19, 20:
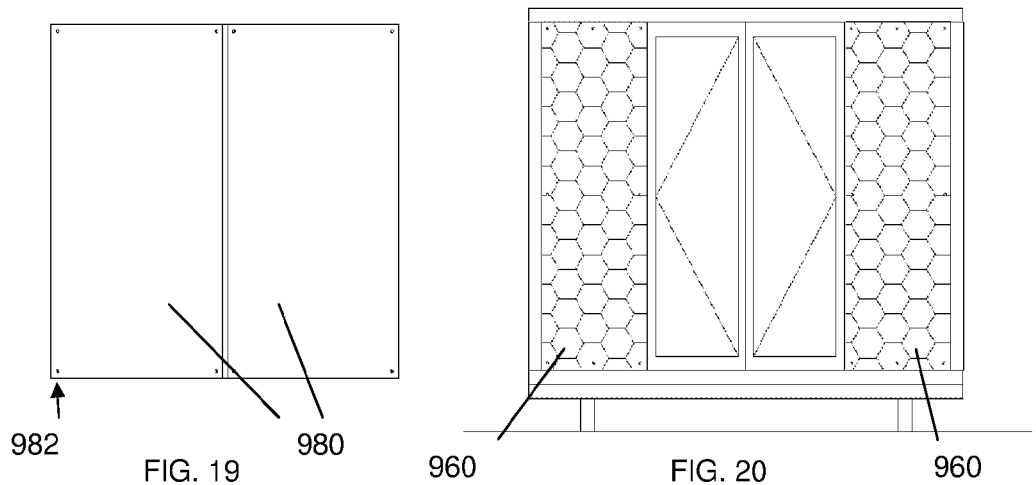
FIG. 19 is a side elevation of a pair of panels according to an embodiment of another aspect of the present invention.
FIG. 20 is a side elevation of an end of a modular building unit according to an embodiment of another aspect of the present invention.

Referring to FIG. 19 there are a pair of side by side panels 980 forming at least a part of an internal wall of a building, or an external cladding. Each panel 980 is comprises a sheet of FRP finished with a decorative appearance, eg a coloured wall. In an alternative the finished appearance may comprise a photograph, a picture, an artwork or an image, such that the surface will be displayed when installed in the building. The finish is applied to the panel prior to installation on the wall. The panels have securing points, in form of holes 982, for bolting or screwing to the frame or other structure of the building. Alternatively the panels may be secured with an adhesive or bonding agent such as a resin. This panel 980 may be used as panel 238 in the previous aspect of the invention.

Figure 21:
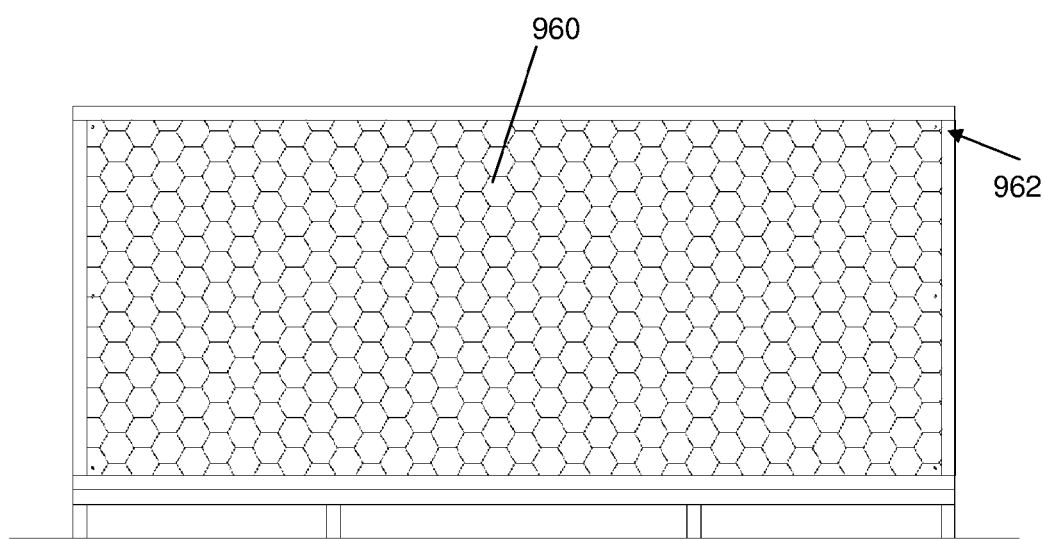
FIG. 21 is a side elevation of a side of the modular building unit of FIG. 20.
Figure 20A:
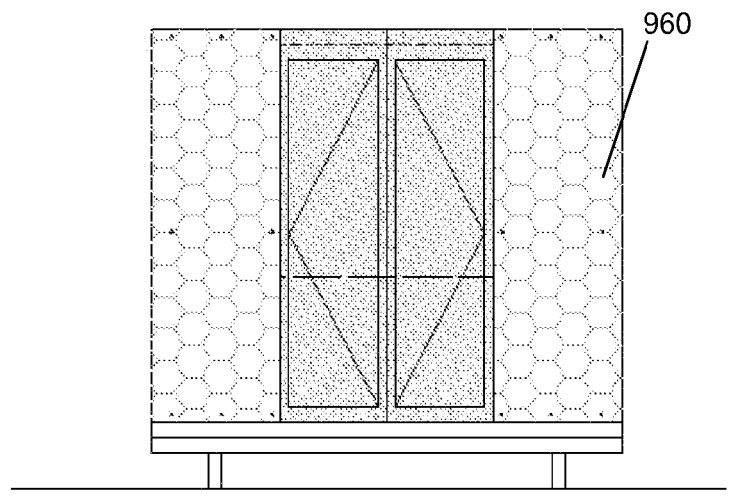
FIG. 20A is a side elevation of an end of an alternative modular building unit according to an embodiment of another aspect of the present invention.
Figure 21A:
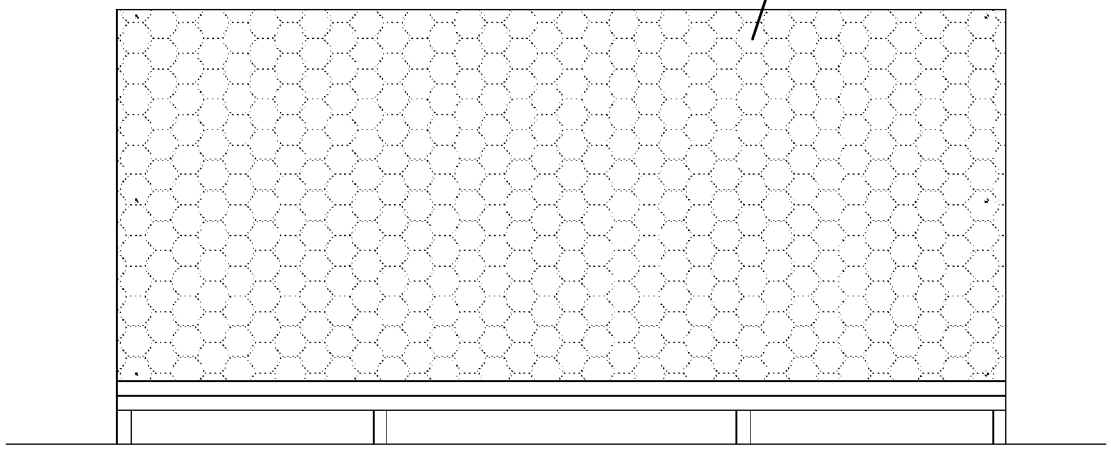
FIG. 21A is a side elevation of a side of the modular building unit of FIG. 20A.

Referring to FIGS. 20 and 21, building unit comprises an external skin 960 in the form of a panel comprising a sheet of FRP. The panel is finished with a decorative appearance, eg a brick pattern, or in this case, by example only, a hexagonal pattern, such that the surface can be displayed when installed on the building. The panels are securing by bolting or screwing the panel through corner holes 962 to the frame or other structure of the building, or by adhesion. FIGS. 20A and 21A show an alternative where the external skin 960 covers the frame 40.

In an embodiment the modular units are configured such that they can be assembled into the building without structural modification.

Building units can be affixed by each other by the frame and the frame transfers loads to the ground/footings. The wall panels in effect reinforce the frame, assist in load transfer.

Referring to FIG. 22, an alternative bank 414 is shown. In essence this bank 414 is substantially the same as the bank 14 described above, except that in this embodiment the bank comprises two end to end elongate modular building units 16'. Also in this embodiment the corridor 30 is replaced by an internal service access-way 30', which may be narrower than corridor 30 and may be walled so that access is only available from above or below, or through a service panel in room 32/32'. The units 16' each comprise a deck for the veranda 36, which is internal to the frame 40, a bedroom 34 and a bathroom 32. The veranda 36 is open to the exterior of the building. The service access-way 30 allows service access to the bathrooms 32 of each unit 16'. Each unit is a discrete dwelling.

Figure 25:
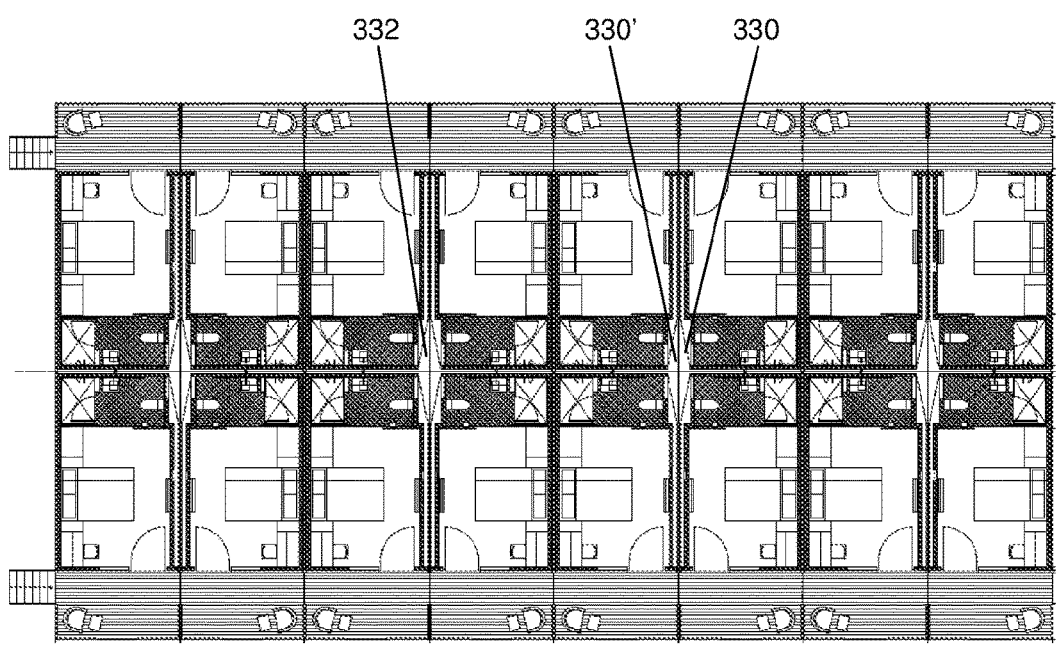
FIG. 25 horizontal cross-sectional plan view of a portion of a building comprising a plurality of building units of FIG. 24.
Figures 26, 27:
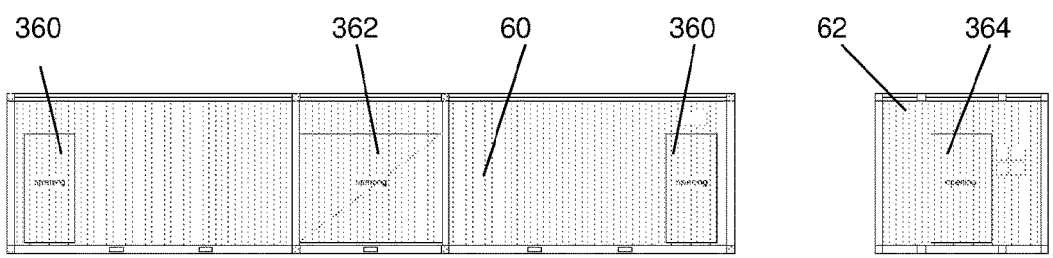
FIG. 26 is a side elevation of the building unit of FIG. 24.
FIG. 27 is an end view of the building unit of FIG. 25.

FIGS. 24 to 27 show a further alternative embodiment. In this embodiment the bank 14 is comprises of a single modular building unit 16" and the units 16" are arranged side by side as shown in FIG. 25. In essence this unit 16" is substantially the same as the bank 14 described above, except that in this embodiment the unit 16" has a longer frame 40 and is divided into two dwellings. There is no corridor 30. This is replaced with an internal service access-way 332 which is made of two part access-way portions 330 and 330' set on complementary sides of adjacent units 16". This form of access-way can by used in the two unit bank embodiment by having each back contribute a portion of the space that makes the service access-way 332.

Again each dwelling of the unit 16" comprises a deck for the veranda 36, which is internal to the frame 40, a bedroom 34 and a bathroom 32, with the bathrooms being adjacent each other and the services are provided via the service access-way 332. Panel portions 360, 362 and 364 may be removed with the panels 60/62 or separately to allow access to the verandas 36 and the service access-way portion 330.

Having a wet area and a "dry area" in the one module becomes possible, such as a bathroom 32 and living room 34 (and veranda 36) in the same modular building unit.

It can be seen that in the above embodiments the modular building unit comprises: a rectangular parallelepiped structural frame 40 suitable for interconnection to another modular building unit in construction of the building 10, whether in a bank of one unit or in a bank or two or three units. The internal structural stud frame wall 80/82 is fixed to the frame 40, and defines rooms within the modular building unit.

The external weather resistant panels 60/62 are affixed to a side and/or end face of the frame 40 and may be removed. The service access-way 30/30'/332 is internal to the frame. It may be covered by the removable panel 60/62 for transport and open to the exterior of the frame when the removable panel 60/62 is removed.

Due to the verandas 36/36' being inside the frame 40, they may be protected from the weather, for example by shutters and or by having a roof, which can allow the wall to the room 34/34' to have glazing.

FIG. 28 shows a detailed horizontal cross-section of D1. The air gap 172 between the external panel 62 and the stub wall 82 is clearly shown.

FIG. 29 shows a detailed horizontal cross-section of D2. Thermal break frame 272 for glassing is shown.

FIG. 30 shows access-way portion 330 in detail D3, where the wall section is the same as 250.

FIG. 30A shows and alterative to the detail of FIG. 30, in which columns 332 are present for attachment of external cladding 232, where the wall section is the same as 230.

FIG. 29A shows and opening 302 from detail D4. There is a balustrade or handrail 304 for providing a safety barrier when the veranda is at height. There is a temporary cover 308, such as of plywood during transport.

FIG. 29B shows an alternative opening 302 with a door 320 to the detail D4. There is a balustrade or hand rail 304 for providing a safety barrier when the veranda is at height. There is a temporary cover 308, such as of plywood during transport.

Figure 31:
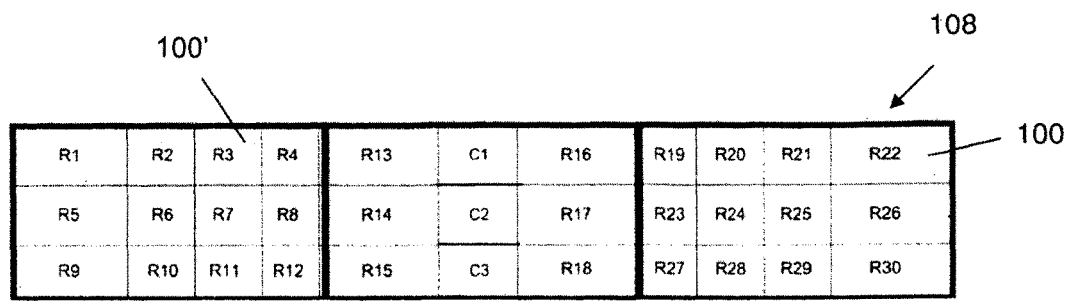
FIG. 31 is a schematic plan view showing portions of an embodiment of a roof of a build according to the present invention.

FIG. 31 shows an example of how a roof part 100 (and 100') may be divided longitudinally into thirds, such that for example portion 108 is divided into roof components R22, R26 and R30. Other forms of roof may be used or an open air corridor may be provided. In an embodiment C1, C2 and C3 are open air.

Figure 32:
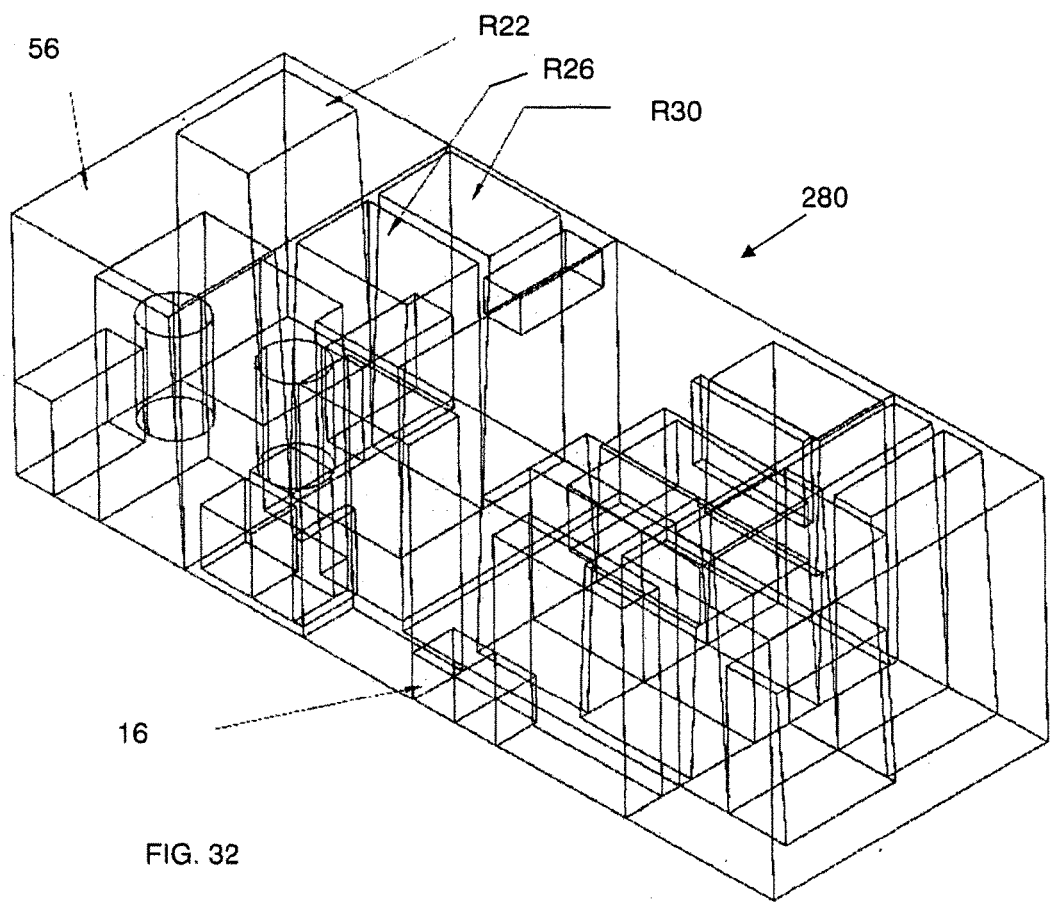
FIG. 32 is a schematic upper isometric of a building unit according to the present invention.

FIG. 32, which is a schematic representation, shows the fittings 280 of the modular unit 16 in place or ready to final fitting prior to transport to site and packaged furnishings inside 56 the unit for transport to site. In particular the roof sections are contained in the unit for transport to site and then assembly. It is desirable that each modular unit contains its own roof components, in this case roof components R22, R26 and R30 of roof portion 108 are show by way of example.

Figure 33:
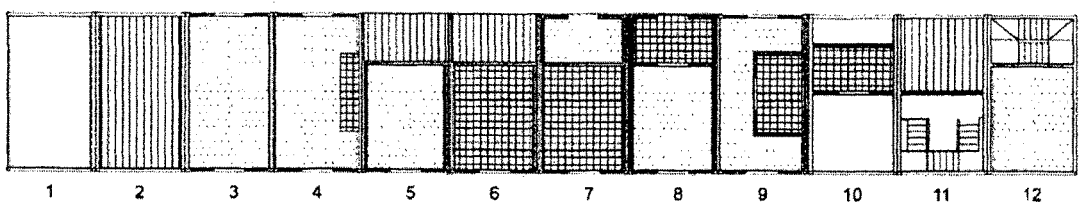
FIG. 33 is a plan view of a selection palette of types of modular building unit according to the present invention.

Referring to FIG. 33 a plurality, in this example 12, different types of unit can be available as stock units, which are prefabricated with fittings, including, external walls, internal walls, doors, and other fittings, such as for example bathroom fittings, kitchen fittings, laundry fittings, lighting, wiring, and plumbing. The wiring and plumbing may be installed on-site or may be ready for connection to other units or externally. Fittings such as lights, taps, air conditioning etc may be installed on site or may be in finished form. This allows the building architect to modularly design the building, order the desired units, ship them to site and assemble to building.

In FIG. 33 each of the types of unit is, by way of example:
1—carport;
2—alfresco area;
3—living room;
4—dining room with kitchen bench;
5—study or bedroom with veranda;
6—bathroom/laundry with veranda;
7—bathroom/laundry with passage;
8—bedroom with bathroom;
9—meals room with kitchen;
10—alfresco with barbeque area;
11—entry veranda with stairs; and
12—stairs entry and living/bedroom area.

In this example, plain white areas may have a concrete floor, vertical linear shading may be a timber or similar floor, dotted areas are "dry areas" floors with furniture and square pattern is a "wet area" with cabinetry and fittings floor.

Internal walls and doors may be of a standard type, such as light steel stud wall supporting spaced apart panels or polycarbonate insulated panels. A door frame may be installed in the wall frame with additional supporting vertical studs.

FIG. 34 shows an assembly process where a modular unit is in container form for transport. Once it arrives on site, it may be ready for assembly in place, or one or more external skins (60/62/64) may be removed as shown in the examples. Walls 60A and 62A may have preparation for site fixing of cladding. Some units may be taller than others, such as in the case of stair wells or elevator shafts. The modular units are then placed into banks, side by side or end to end and the banks formed into the building, including in some embodiments stacking of the units. The internal structure of the modular unit, which allows it to be stacked for transport and also allows it to be stacked in construction of the building. When adjacent units have the skins 60 removed, as well as support members 52 to create a larger open area, additional bracing may be employed in the other walls of the unit or in surrounding units to compensate to the removal of the support members or ceiling. In addition or instead corner braces may be employed for structural strengthening.

Further it is desirable to have the vertical support in the nearest adjacent wall retained (not removed), that is the nearest vertical support connected via the nearest intersection 48 to retain structural integrity of the unit.

The transportability of the units may also be useful not just to construct a building, but also to move the building to a different location, or to break up the building and reuse the modular units on one or more other buildings of different design.

The present invention may have particular advantages where the building is in a remote location and there are significant transportation costs involved in construction of the building and or where labour costs are significant as it is desirable to minimise the on-site construction costs. However application of the invention is not limited to remote locations.

Modifications may be made to the present invention with the context of that described and shown in the drawings. Such modifications are intended to form part of the invention described in this specification.

The invention claimed is:

1. A modular building unit for construction of a building, said modular building unit comprising:
a structural frame suitable for interconnection to another modular building unit construction of the building,
wherein the modular building unit is adapted to be transported as a shipping container; and a stud frame panel immovably fixed internal to the structural frame, wherein the stud frame panel comprises a frame, which is distinct from the structural frame, and a plurality of vertically extending studs when the modular building unit is assembled in the building; wherein the stud frame panel is structurally load bearing; wherein the structural frame and stud frame panel are directly and immovably fastened so as to be load bearing in combination, wherein the stud frame panel is inwardly spaced from a parallel adjacent external face of the structural frame,
wherein the building unit comprises a longitudinal extending stair well, wherein a longest dimension of the modular building unit extends in a vertical orientation when formed as part of the modular building.

2. A modular building unit for construction of a building, said modular building unit comprising:
a structural frame suitable for interconnection to another modular building unit in construction of the building,
wherein the modular building unit is adapted to be transported as a shipping container; and a stud frame panel immovably fixed internal to the structural frame, wherein the stud frame panel comprises a frame, which is distinct from the structural frame, and a plurality of vertical extending studs when the modular building unit is assembled in the building; wherein the stud frame panel is structurally load bearing; wherein the structural frame and stud frame panel are directly and immovably fastened so as to be load bearing in combination, wherein the stud frame panel is inwardly spaced from a parallel adjacent external face of the structural frame,
wherein the modular building unit comprises an internal structure connected to the structural frame, wherein the internal structure comprises the stud frame panel and at least one further stud frame panel so as to form peripheral side or end walls of the internal structure, and a load bearing top panel so as to form a roof of the internal structure.

3. A modular building unit for construction of a building, said modular building unit comprising:
a structural frame suitable for interconnection to another modular building unit in construction of the building,
wherein the modular building unit is adapted to be transported as a shipping container; and a stud frame panel immovably fixed internal to the structural frame, wherein the stud frame panel comprises a frame, which is distinct from the structural frame, and a plurality of vertical extending studs when the modular building unit is assembled in the building; wherein the stud frame panel is structurally load bearing; wherein the structural frame and stud frame panel are directly and immovably fastened so as to be load bearing in combination, wherein the stud frame panel is inwardly spaced from a parallel adjacent external face of the structural frame,
wherein the stud frame panel is connected to another stud frame panel in a manner that forms a wall comprising a corner where the respective stud frame panels extend from the corner,
wherein the wall is structurally load bearing so as to be able to withstand hurricane conditions, such that the stud frame panels add to the structural integrity provided by the structural frame.

4. A modular building unit comprising an integrally formed parallelepiped structural frame comprising frame vertical posts, and a structural wall comprising structural wall segments at an angle to each other so as to extend in different directions at a corner of the structural wall, wherein at least one of the structural wall segments is offset inwardly from the structural frame so as to provide an inward indent from a plan extending through the outermost face of the frame vertical posts and receives a weather resistant panel within the indent without extending past the external face of the vertical posts, the at least one of the structural wall segments comprising a single vertical post at the corner of the structural wall, wherein the vertical post is structurally load bearing and is arranged to be directly fixed to one of the frame vertical posts so as to fix the at least one of the structural wall segments to the structural frame,
wherein the inward indent extends inwardly by a distance larger than a thickness of a weathering steel panel so that the inward indent provides an air gap between the panel and the structural wall when the panel is received in the inward indent.

5. A modular building unit comprising an integrally formed parallelepiped structural frame comprising frame vertical posts, and a structural wall comprising structural wall segments at an angle to each other so as to extend in different directions at a corner of the structural wall, wherein at least one of the structural wall segments is offset inwardly from the structural frame so as to provide an inward indent from a plane extending through the outermost face of the frame vertical posts and receives a weather resistant panel within the indent without extending past the external face of the vertical posts, the at least one of the structural wall segments comprising a single vertical post at the corner of the structural wall, wherein the vertical post is structurally load bearing and is arranged to be directly fixed to one of the frame vertical posts so as to fix the at least one of the structural wall segments to the structural frame.

* * * * *